(12) United States Patent
Fujikawa

(10) Patent No.: US 12,553,217 B2
(45) Date of Patent: Feb. 17, 2026

(54) SHOVEL AND DISPLAY DEVICE FOR SHOVEL

(71) Applicant: SUMITOMO CONSTRUCTION MACHINERY CO., LTD., Tokyo (JP)

(72) Inventor: Tomoyuki Fujikawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 174 days.

(21) Appl. No.: 18/476,727

(22) Filed: Sep. 28, 2023

(65) Prior Publication Data

US 2024/0018749 A1    Jan. 18, 2024

Related U.S. Application Data

(63) Continuation of application No. PCT/JP2022/015320, filed on Mar. 29, 2022.

(30) Foreign Application Priority Data

Mar. 31, 2021 (JP) .................................. 2021-062429

(51) Int. Cl.
*G06F 3/04847* (2022.01)
*E02F 9/26* (2006.01)
*E02F 9/22* (2006.01)

(52) U.S. Cl.
CPC ............ *E02F 9/26* (2013.01); *G06F 3/04847* (2013.01); *E02F 9/2228* (2013.01); *E02F 9/2285* (2013.01); *E02F 9/2292* (2013.01); *E02F 9/2296* (2013.01)

(58) Field of Classification Search
CPC .......... G06F 3/038; G06F 3/048; G06F 30/15; B60K 2360/171; B60K 35/10; B60K 35/22; B60Y 2200/41; B60Y 2200/412; E02F 9/2012; E02F 9/20

See application file for complete search history.

(56) References Cited

U.S. PATENT DOCUMENTS

| | | | |
|---|---|---|---|
| 2006/0047394 A1 | 3/2006 | Price et al. | |
| 2007/0168101 A1* | 7/2007 | Shibamori | ............... E02F 9/26 701/50 |
| 2014/0297106 A1* | 10/2014 | Magaki | ..................... E02F 9/26 701/36 |
| 2015/0328988 A1 | 11/2015 | Kim et al. | |
| 2019/0360178 A1* | 11/2019 | Morimoto | .............. B60K 35/00 |
| 2020/0256034 A1 | 8/2020 | Yamamoto | |

(Continued)

FOREIGN PATENT DOCUMENTS

| | | |
|---|---|---|
| JP | 2001-214469 | 8/2001 |
| JP | 2003-058204 | 2/2003 |
| JP | 2005-59779 | 3/2005 |

(Continued)

OTHER PUBLICATIONS

International Search Report for PCT/JP2022/015320 mailed on Jun. 21, 2022.

*Primary Examiner* — Phuong H Nguyen
(74) *Attorney, Agent, or Firm* — IPUSA, PLLC

(57) ABSTRACT

A shovel includes a lower traveling body; an upper swinging body swingably mounted on the lower traveling body; an operator's cab mounted on the upper swinging body; a display device provided in the operator's cab; and a processor configured to cause the display device to display information about custom setting before a start of operation of the shovel.

19 Claims, 11 Drawing Sheets

(56) References Cited

U.S. PATENT DOCUMENTS

2020/0399857 A1    12/2020  Yamamoto
2023/0036971 A1*    2/2023  Kirchmair .............. B60K 35/00

FOREIGN PATENT DOCUMENTS

| JP | 2005-264613 | 9/2005 |
| JP | 2006-107461 | 4/2006 |
| JP | 2011-127372 | 6/2011 |
| JP | 2012-66663 | 4/2012 |
| JP | 2018-048530 | 3/2018 |
| WO | 2018/164152 | 9/2018 |
| WO | 2019/093103 | 5/2019 |
| WO | 2019/187519 | 10/2019 |

* cited by examiner

SHOVEL AND DISPLAY DEVICE FOR SHOVEL

CROSS-REFERENCE TO RELATED APPLICATION

The present application is a continuation of International Patent Application No. PCT/JP2022/015320, filed Mar. 29, 2022, which is based on and claims priority to Japanese Patent Application No. 2021-062429, filed Mar. 31, 2021. The entire contents these applications are incorporated herein by reference.

BACKGROUND

1. Technical Field

The present disclosure relates to shovel and a display device for a shovel.

2. Description of Related Art

A shovel configured to adjust the operability of the shovel according to the preference of the operator is known.

SUMMARY

A shovel includes a lower traveling body; an upper swinging body swingably mounted on the lower traveling body; an operator's cab mounted on the upper swinging body; a display device provided in the operator's cab; and a processor configured to cause the display device to display information about custom setting before a start of operation of the shovel.

DETAILED DESCRIPTION

Figure 1:
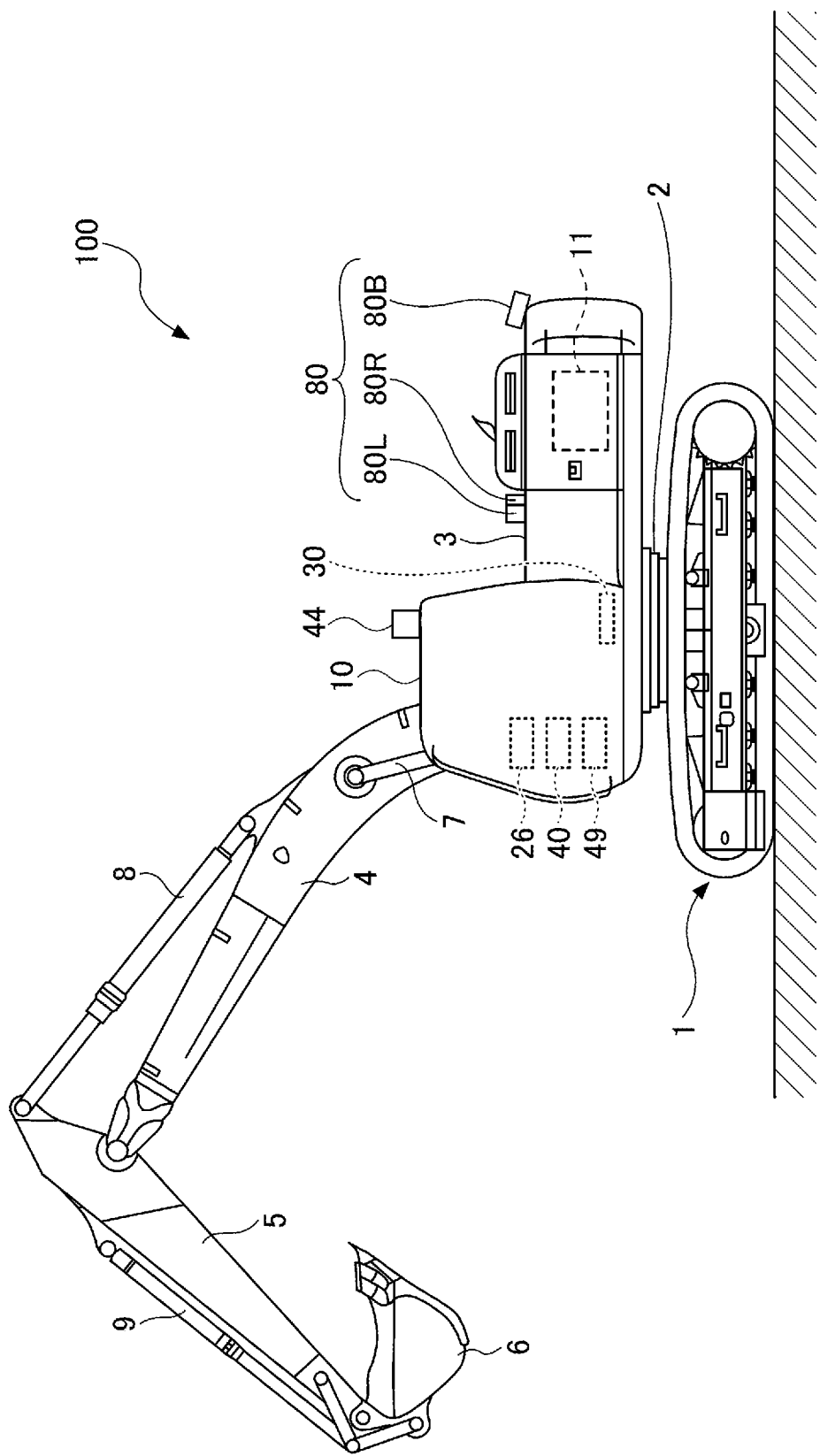
FIG. 1 is a diagram showing an example of a construction of a shovel according to an embodiment of the present invention.

In the shovel as described above, the operator must perform a complicated operation such as displaying a setting screen page in order to understand whether or not the operability of the shovel has been adjusted before the shovel is operated.

Therefore, it is desirable to enable the operator to understand the state of the shovel more easily.

Hereinafter, the embodiment of the present invention will be described with reference to the drawings. In each drawing, the same components may be denoted by the same reference numerals and duplicate descriptions may be omitted.

Figure 2:
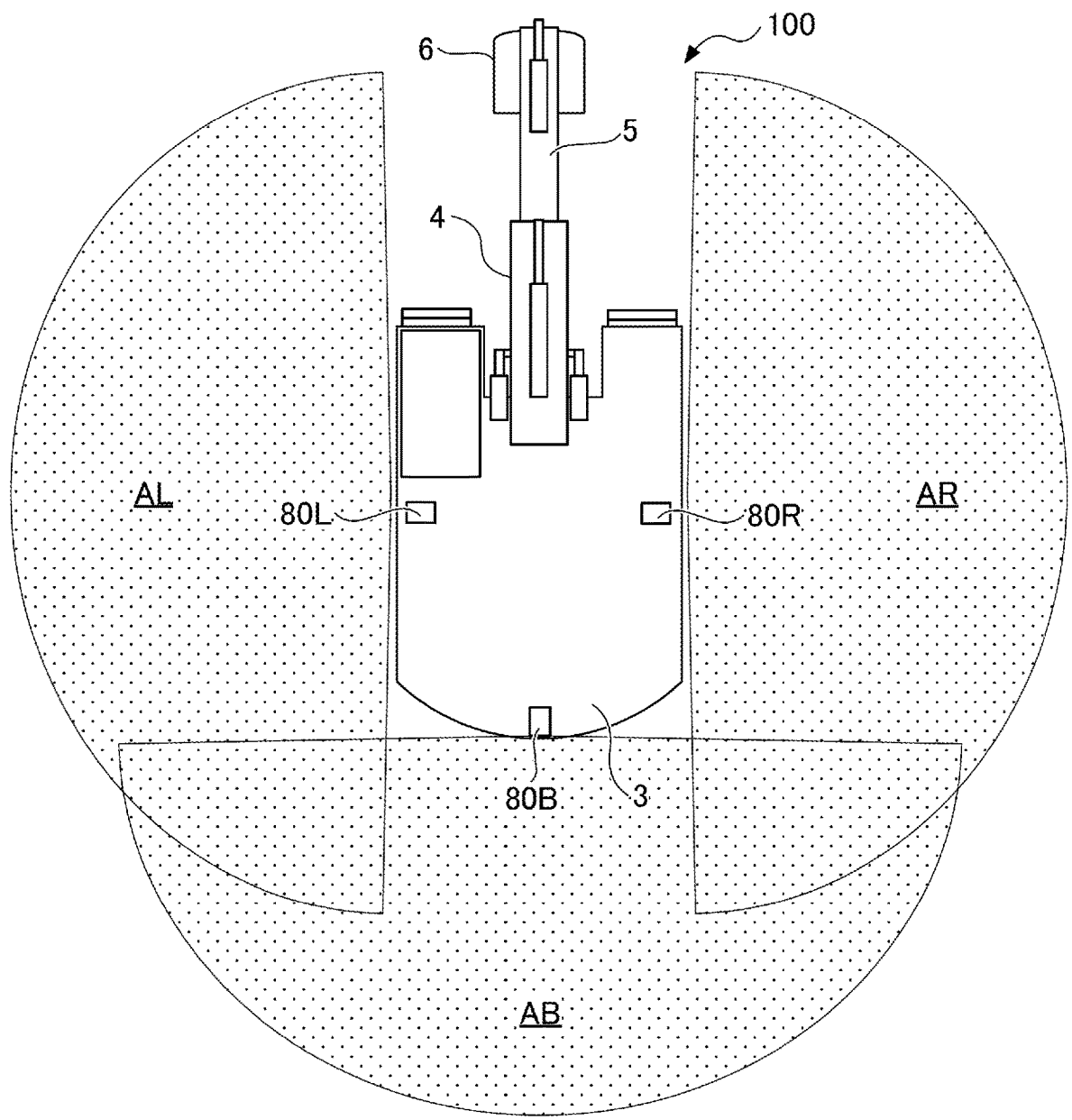
FIG. 2 is a top view of the shovel of FIG. 1.

First, a shovel as an excavator according to the embodiment of the present invention will be described with reference to FIGS. 1 and 2. FIG. 1 is a diagram showing a configuration example of a shovel according to the embodiment of the present invention. FIG. 2 is a top view of the shovel of FIG. 1.

As shown in FIG. 1, in the shovel 100, an upper swinging body 3 is swingably mounted on a crawler type lower traveling body 1 via a swinging mechanism 2. A boom 4 as a work element is attached to the upper swinging body 3. An arm 5 as a work element is attached to an extending end of the boom 4, and a bucket 6 as a work element and as an end attachment is attached to an extending end of the arm 5. The boom 4 is driven by a boom cylinder 7, the arm 5 is driven by an arm cylinder 8, and the bucket 6 is driven by a bucket cylinder 9.

The upper swinging body 3 is provided with a cabin 10, and a power source such as an engine 11 is mounted on the upper swinging body 3. A swinging oil hydraulic motor, a controller 30, an image capturing device 80, and the like are attached to the upper swinging body 3. The swinging oil hydraulic motor may be replaced with a swinging electric motor-generator.

A manually operating device 26, a display device 40, an alarm device 49, and the like are provided inside the cabin 10. In the present specification, for convenience, the direction in which a work element such as the boom 4 is attached to the upper swinging body 3 is designated as a front direction, and the direction in which the counterweight is attached is designated as a rear direction.

The controller 30 is configured to control the shovel 100. In the example of FIG. 1, the controller 30 is configured as a computer having a CPU, a RAM, a NVRAM, a ROM, and the like. In this case, the controller 30 reads a program corresponding to each functional element from the ROM, writes it to the RAM, and causes the CPU to execute the corresponding processing. However, each functional element may be implemented by hardware or may be implemented by a combination of software and hardware.

The image capturing device 80 is configured to capture an image of the surroundings of the shovel 100. The image capturing device 80 is, for example, a monocular camera, a stereo camera, a rang imaging camera, an infrared camera, a LIDAR, or the like. In the example of FIG. 1, the image capturing device 80 includes a rear camera 80B attached to the rear end of the upper surface of the upper swinging body 3, a left camera 80L attached to the left end of the upper surface of the upper swinging body 3, and a right camera 80R attached to the right end of the upper surface of the upper swinging body 3.

The rear camera BOB, the left camera 80L, and the right camera 80R are all attached to the upper swinging body 3 in such a manner that the optical axes point obliquely downward and portions of the upper swinging body 3 are included in their image capturing ranges. Therefore, each image capturing range of the rear camera 80B, the left camera 80L, and the right camera 80R has a viewing angle of about 180 degrees in the top view, for example. In the example of FIG. 2, the image capturing range AB represents an example of the image capturing range of the rear camera 80B, the image capturing range AL represents an example of the image capturing range of the left camera 80L, and the image capturing range AR represents an example of the image capturing range of the right camera 80R.

The image capturing device 80 may function as an object detection device for detecting a predetermined object in a predetermined area around the shovel 100. In this case, the image capturing device 80 may include an image processing device. The image processing device performs known image processing on an image (input image) captured by the image capturing device 80 to detect an image of a predetermined object included in the input image. When the image of the predetermined object is detected, the image capturing device 80 outputs an object detection signal to the controller 30. The predetermined object may be, for example, a person, an animal, a vehicle, a machine, or the like. The image processing device may be configured to detect a moving object. The image processing device may be integrated with the controller 30. The object detection device may be a LIDAR, ultrasonic sensor, millimeter wave sensor, laser radar sensor, infrared sensor, etc.

The shovel 100 may be configured to include an object detection device (LIDAR, millimeter wave radar, stereo camera, etc.) as an object detection part in addition to the image capturing device 80 (i.e., the rear camera 80B, the left camera 80L, and the right camera 80R). In this case, the shovel 100 may display information about an object detected by the object detection device on the display device 40.

Figure 3:
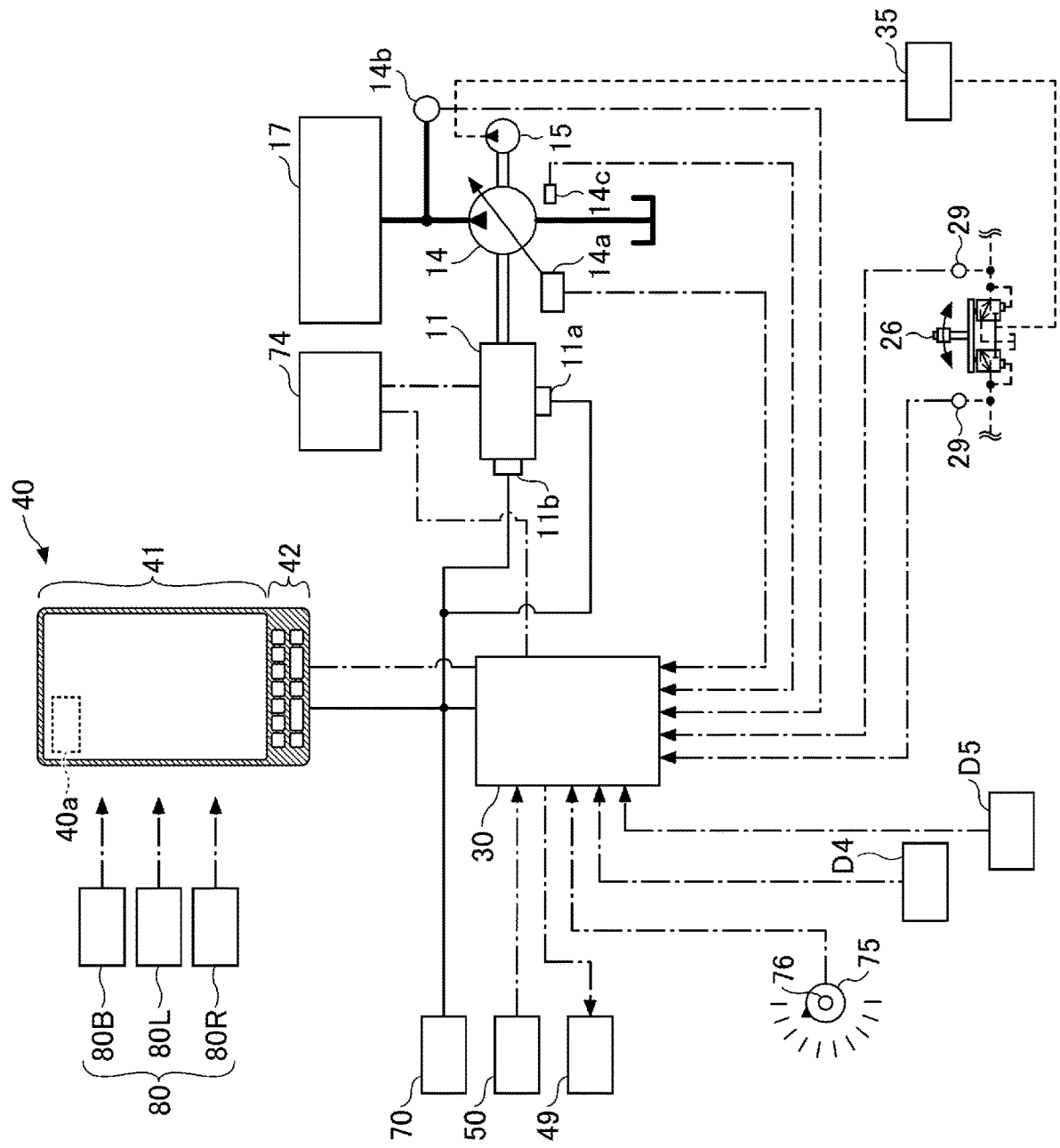
FIG. 3 is a diagram showing an example of a configuration of a basic system mounted on the shovel of FIG. 1.

Next, a basic system mounted on the shovel 100 of FIG. 1 will be described with reference to FIG. 3. FIG. 3 shows a configuration of an example of a basic system mounted on the shovel 100 of FIG. 1. In FIG. 3, mechanical power transmission lines are indicated as double lines, hydraulic oil lines as thick solid lines, pilot lines as dashed lines, power lines as thin solid lines, and electrical control lines as alternate long and short dash lines.

As shown in FIG. 3, the basic system mainly includes the engine 11, main pumps 14, a pilot pump 15, a control valve unit 17, the manually operating device 26, an operating pressure sensor 29, the controller 30, a switching valve 35, the display device 40, an alarm device 49, a dial 75, an ECO button 76, a gate lock lever D4, a key switch D5, etc.

The engine 11 is a diesel engine that employs isochronous control to maintain a constant engine speed regardless of an increase or decrease in load. Fuel injection quantity, fuel injection timing, boost pressure, etc. in the engine 11 are controlled by an engine control unit (ECU 74).

The engine 11 is connected to the main pumps 14 and the pilot pump 15 as oil hydraulic pumps, respectively. The main pumps 14 are connected to the control valve unit 17 via hydraulic oil lines.

The control valve unit 17 is an oil hydraulic control device for controlling the hydraulic system of the shovel 100. The control valve unit 17 is connected to oil hydraulic actuators such as a left traveling oil hydraulic motor, a right traveling oil hydraulic motor, the boom cylinder 7, the arm cylinder 8, the bucket cylinder 9, and the swinging oil hydraulic motor.

Specifically, the control valve unit 17 includes a plurality of spool valves corresponding to respective oil hydraulic actuators. Each spool valve is configured to be displaceable in response to pilot pressure so that the opening area of the PC port and the opening area of the CT port can be increased or decreased accordingly. The PC port communicates the main pump 14 with the oil hydraulic actuator. The CT port communicates the oil hydraulic actuator with the hydraulic oil tank.

The pilot pump 15 is connected to the manually operating device 26 via a pilot line. The manually operating device 26 includes, for example, a left operating lever, a right operating lever, and a traveling manually operating device. The traveling manually operating device includes, for example, a traveling lever and a traveling pedal. In the present embodiment, each element of the manually operating device 26 is an oil hydraulic manually operating device connected via a pilot line to the pilot port of the corresponding spool valve included in the control valve unit 17. However, the manually operating device 26 may be replaced with an electric manually operating device.

In addition, the pilot pump 15 may be omitted. In this case, the function performed by the pilot pump 15 may be realized by the main pumps 14. That is, the main pumps 14 may have functions of supplying hydraulic oil to the manually operating device 26 or the like after lowering the pressure of the hydraulic oil through a throttle or the like, in addition to the function of supplying hydraulic oil to the control valve unit 17.

The operating pressure sensor 29 detects operation content with respect to the manually operating device 26 as pressure. The operating pressure sensor 29 outputs the detected value to the controller 30. However, operation content with respect to the manually operating device 26 may be detected electrically.

The switching valve 35 is configured to switch between the effective state and the ineffective state of the manually operating device 26. The effective state of the manually operating device 26 is a state in which the operator can operate the oil hydraulic actuators using the manually operating device 26. The ineffective state of the manually operating device 26 is a state in which the operator cannot operate the oil hydraulic actuators using the manually operating device 26. In the present embodiment, the switching valve 35 is a gate lock valve configured to operate in response to a command from the controller 30. Specifically, the switching valve 35 is provided in the pilot line connecting the pilot pump 15 and the manually operating device 26, and is configured to switch the interrupting/communicating of the pilot line in response to a command from the controller 30. For example, the manually operating device 26 becomes effective when the gate lock lever D4 is pulled up and the switching valve 35 (gate lock valve) is opened, and becomes ineffective when the gate lock lever D4 is pushed down and the switching valve 35 (gate lock valve) is closed.

The display device 40 is an example of a display device for the shovel and is configured to display various kinds of information. The display device 40 may be connected to the controller 30 via a communication network such as a CAN or may be connected to the controller 30 via a leased line. In the present embodiment, the display device 40 is configured to display one or more captured images captured by the image capturing device 80 and a menu screen page. The display device 40 operates by receiving power from a storage battery 70. The display device 40 includes a control part 40a, an image display part 41, and a manually operating part 42.

The control part 40a controls an image displayed on the image display part 41. In the present embodiment, the control part 40a includes a computer equipped with a CPU, a RAM, a NVRAM, a ROM, and the like. In this case, the control part 40a reads a program corresponding to each functional element from the ROM, writes it to the RAM, and causes the CPU to execute the corresponding processing. However, each functional element may be implemented by hardware or a combination of software and hardware. The image displayed on the image display part 41 may be controlled by the controller 30 or the image capturing device 80.

The image display part 41 displays a captured image captured by at least one element included in the image capturing device 80 and the menu screen page. The captured image may be, for example, a rear image captured by the rear camera BOB, a left image captured by the left camera 80L, or a right image captured by the right camera 80R. The captured image may be, for example, a bird's eye view image in which respective captured images captured by the rear camera 80B, the left camera 80L, and the right camera 80R are combined. The captured image may include two or more images selected from the rear image, the left image, the right image, and the bird's eye image. The menu screen page may be a state screen page showing the state of the shovel 100 and may be a setting screen page showing various settings of the shovel 100.

The manually operating part 42 is a switch panel including hardware switches. The manually operating part 42 may be a touch panel. In the present embodiment, the manually operating part 42 is disposed below the image display part 41 and includes switches (for example, menu switches) for changing an image displayed by the image display part 41. However, the position of the manually operating part 42 is not limited to the above example, and may be placed, for example, on an operating lever, or on a left side console or a right side console on the left or right side of the operator's seat. In addition to the manually operating part 42 provided in the display device 40, an operator's side manually operating part 50 having the same function as the manually operating part 42 may be arranged on at least one of the operating lever, the left side console of the seat, and the right side console of the seat.

In the present embodiment, the image display part 41 displays the menu screen page when a menu switch of the manually operating part 42 is operated while a right image RG and a rear image BG captured by the image capturing device 80 are displayed. For example, the image display part 41 reduces the size of the rear image BG and displays a screen page for selecting menu detail items without changing the size of the right image RG before and after the operation of the menu switch of the manually operating part 42. Then, when a predetermined switch of the manually operating part 42 has been operated in a state where the screen page for selecting the menu detail items is displayed, the image display part 41 switches the rear image BG to a menu screen page such as a state screen page showing the state of the shovel 100 and a setting screen page showing various settings of the shovel 100. At this time, the image display part 41 displays the right image RG in a state in which the size of the right image RG is maintained without being changed.

The image display part 41 may be configured to display the menu screen page when a menu switch of the manually operating part 42 is operated, regardless of whether the shovel 100 is in a state of being able to be operated or a state of not being able to be operated. Alternatively, the image display part 41 may be configured to display the menu screen page in response to a menu switch of the manually operating part 42 being operated, only when the shovel 100 is in a state of not being able to be operated. For example, these alternatives may be configured to be switchable therebetween by a switching part such as a changeover switch.

The state in which the shovel 100 is able to be operated is a state in which, for example, the gate lock lever D4 is pulled up and the switching valve 35 is opened so that the manually operating device 26 is effective. The state of the gate lock lever D4 at this time is referred to as an unlocking state. The state in which the shovel 100 is not be able to be operated is, for example, a state in which the manually operating device 26 is ineffective when the gate lock lever D4 is depressed to close the switching valve 35. The state of the gate lock lever D4 at this time is referred to as a locked state.

The storage battery 70 is charged with electricity generated by an alternator 11a, for example. The power of the storage battery 70 is also supplied to the controller 30 and the like. For example, a starter 11b of the engine 11 is driven by the power from the storage battery 70 to start the engine 11.

The ECU 74 transmits data about the state of the engine 11, such as the cooling water temperature, to the controller 30. Regulators 14a of the main pumps 14 transmit data about the swash plate tilting angles to the controller 30. A discharge pressure sensor 14b transmits data about the discharge pressures of the main pumps 14 to the controller 30. An oil temperature sensor 14c provided in the pipe line between the hydraulic oil tank and the main pumps 14 transmits data about the temperature of the hydraulic oil flowing in the pipe line to the controller 30. An operating pressure sensor 29 transmits data about the pilot pressure generated when the manually operating device 26 is operated to the controller 30. The controller 30 stores these data in a temporary storage part (memory) and transmits the data to the display device 40 when necessary.

The dial 75 is configured for the operator to adjust the target speed of the engine 11. Specifically, the dial 75 is configured to transmit information indicating the setting state of the target speed of the engine 11 to the controller 30. In the present embodiment, the dial 75 is configured to switch the target speed in 10 steps from the first level (the level corresponding to the lowest target speed) to the tenth level (the level corresponding to the highest target speed). The actual speed of the engine 11 is controlled to be the target speed selected by the dial 75.

An ECO button 76 is an example of an operating tool for switching ECO mode from off to on and vice-versa. The ECO mode is one of work modes of the shovel 100, and is a work mode in which a function for suppressing fuel consumption is performed. In the present embodiment, the work mode of the shovel 100 is configured to be switched between the ECO mode and a normal mode each time the ECO button 76 is pressed. The normal mode is one of the work modes of the shovel 100, and is a work mode in which a function for suppressing fuel consumption is not performed. The function performed in the ECO mode includes, for example, a function for slowing down the movements of the attachments. When the function for slowing down the movements of the attachments is performed, the respective extension and retraction accelerations of the boom cylinder 7, the arm cylinder 8, and the bucket cylinder 9 in response to the corresponding operating levers being shifted away from their neutral positions are limited to predetermined values or less. In the present embodiment, the maximum extension and retraction speeds are not controlled, but, also the maximum extension and retraction speeds may be configured to be controlled. In the present embodiment, the extension and retraction accelerations in response to the operating levers being returned to the neutral positions are not controlled, but, also the extension and retraction accelerations in response to the operating levers being returned to the neutral positions may be configured to be controlled. This function is realized, for example, by controlling the stroke accelerations (increase rates of pilot pressures) of the control valves 174, 175L, 175R, 176L, and 176R. By using the ECO button 76, the operator of the shovel 100 can suppress fuel consumption as needed. Therefore, the shovel 100 can be adapted to the case where, for example, the operator wants to suppress fuel consumption even if the workability of the shovel 100 is limited accordingly.

The alarm device 49 is a device for attracting the attention of a person engaged in the work of the shovel 100. The alarm device 49 includes, for example, a combination of an indoor alarm device and an outdoor alarm device. The indoor alarm device is a device for alerting the operator of the shovel 100 in the cabin 10 and includes, for example, at least one of a sound output device, a vibration generator, or a light emitting device provided in the cabin 10. The indoor alarm device may be the display device 40. The outdoor alarm device is a device for alerting a worker working around the shovel 100 and includes, for example, at least one of a sound output device or a light emitting device provided outside the cabin 10. The sound output device as the outdoor alarm device includes, for example, a traveling alarm device mounted on the bottom surface of the upper swinging body 3. The outdoor alarm device may be a light emitting device mounted on the upper swinging body 3. However, the outdoor alarm device may be omitted. The alarm device 49 may, for example, notify a person engaged in the work of the shovel 100 when the image capturing device 80 functioning as an object detection device detects a predetermined object.

The key switch D5 is a device for starting the shovel 100. In the example shown in FIG. 3, the key switch D5 includes a key cylinder into which a mechanical key is inserted. However, the key switch D5 may be a button type device used in a smart entry system or the like. Specifically, the key switch D5 is configured so that one of four rotational positions is selected by turning the mechanical key inserted into the key cylinder. The four rotational positions are an OFF position, an ACC position, an ON position, and a START position. When the rotational position of the mechanical key is the OFF position, the power supply to the controller 30 is cut off. When the rotational position of the mechanical key is the ACC position or the ON position, the power supply to the controller 30 is performed. When the rotational position of the mechanical key is the START position, the power supply to the starter 11b of the engine 11 is performed.

Figure 4:
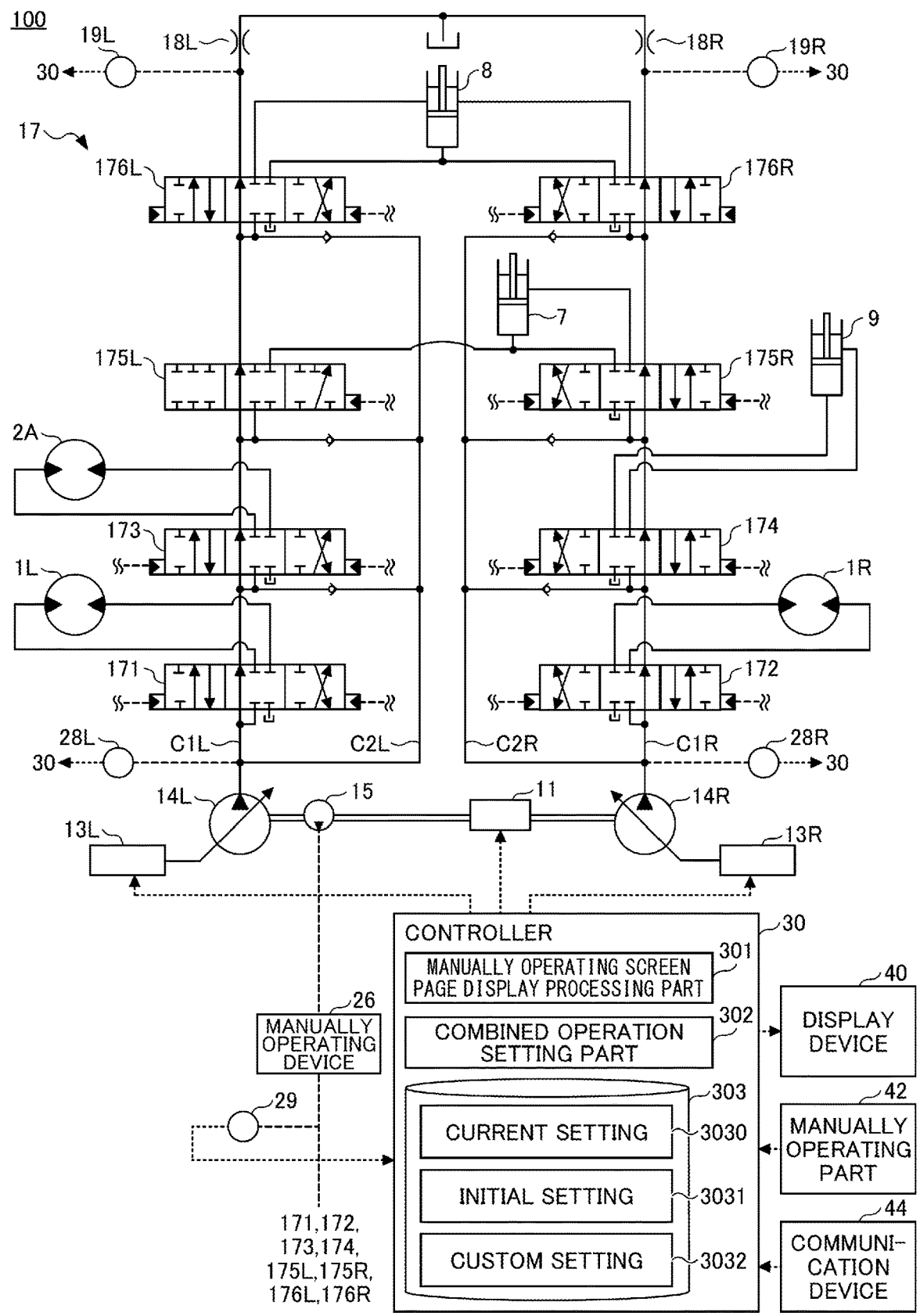
FIG. 4 is a diagram showing an example of a detailed configuration of the shovel.

FIG. 4 is a diagram showing an example of a detailed configuration of the shovel 100 according to the present embodiment. In the figure, the mechanical power lines are indicated by double lines, the high-pressure oil hydraulic lines by solid lines, the pilot lines by dashed lines, and the electric drive/control lines by dotted line.

The oil hydraulic drive system for hydraulically driving the oil hydraulic actuators of the shovel 100 according to the present embodiment includes the engine 11, the main pumps 14L and 14R, and the control valve unit 17. As described above, the hydraulic drive system of the shovel 100 according to the present embodiment includes the oil hydraulic actuators such as traveling oil hydraulic motors 1L and 1R, a swinging oil hydraulic motor 2A, a boom cylinder 7, an arm cylinder 8, and a bucket cylinder 9 for hydraulically driving the lower traveling body 1, the upper swinging body 3, the boom 4, the arm 5, and the bucket 6, respectively.

The engine 11 is the main power source in the hydraulic drive system and is mounted, for example, at the rear of the upper swinging body 3. Specifically, the engine 11 rotates at a predetermined target speed under the control of the controller 30 to drive the main pumps 14L and 14R and the pilot pump 15. The engine 11 is, for example, a diesel engine fueled with diesel oil.

The main pumps 14L and 14R are, for example, mounted at the rear of the upper swinging body 3, as the engine 11, and supply hydraulic oil to the control valve unit 17 through the high-pressure hydraulic lines. Each of the main pumps 14L and 14R is driven by the engine 11 as described above. The main pumps 14L and 14R are, for example, variable displacement oil hydraulic pumps, and the stroke lengths of the pistons can be adjusted by adjusting the angles (tilting angles) of the swash plates by the regulators 13L and 13R under the control of the controller 30 described later, and the discharge flow rates (discharge pressures) can be thus controlled.

The control valve unit 17 is, for example, an oil hydraulic controller, is mounted in the center of the upper swinging body 3, and controls the oil hydraulic drive system in response to the operation of the manually operating device 26 by an operator or the like. The control valve unit 17 is connected to the main pumps 14L and 14R via the high-pressure hydraulic oil lines as described above, and selectively supplies hydraulic oil supplied from the main pumps 14L and 14R to the traveling oil hydraulic motors 1L (for a left-hand crawler) and 1R (for a right-hand crawler) that are oil hydraulic actuators, the swinging oil hydraulic motor 2A, the boom cylinder 7, the arm cylinder 8, and the bucket cylinder 9 in accordance with the operation state of the manually operating device 26. Specifically, the control valve unit 17 includes control valves 171, 172, 173, 174, 175L, 175R, 176L, and 176R for controlling the flow rates and flow directions of hydraulic oil supplied from the main pumps 14L and 14R to the oil hydraulic actuators, respectively.

The oil hydraulic drive system circulates hydraulic oil from the main pumps 14L and 14R driven by the engine 11 to the hydraulic oil tank via the center bypass oil passages C1L and C1R and the parallel oil passages C2L and C2R, respectively.

The center bypass oil passage C1L passes through the control valves 171, 173, 175L, and 176L arranged in the control valve unit 17 in this order from the main pump 14L to the hydraulic oil tank.

The center bypass oil passage C1R passes through the control valves 172, 174, 175R, and 176R arranged in the control valve unit 17 in this order from the main pump 14R to the hydraulic oil tank.

The control valve 171 is a spool valve for supplying the hydraulic oil discharged from the main pump 14L to the traveling oil hydraulic motor 1L and discharging the hydraulic oil discharged from the traveling oil hydraulic motor 1L to the hydraulic oil tank.

The control valve 172 is a spool valve for supplying the hydraulic oil discharged from the main pump 14R to the traveling oil hydraulic motor 1R and discharging the hydraulic oil discharged from the traveling oil hydraulic motor 1R to the hydraulic oil tank.

The control valve 173 is a spool valve for supplying the hydraulic oil discharged from the main pump 14L to the swinging oil hydraulic motor 2A and discharging the hydraulic oil discharged from the swinging oil hydraulic motor 2A to the hydraulic oil tank.

The control valve 174 is a spool valve for supplying the hydraulic oil discharged from the main pump 14R to the bucket cylinder 9 and discharging the hydraulic oil in the bucket cylinder 9 to the hydraulic oil tank.

The control valves 175L and 175R are spool valves for respectively supplying the hydraulic oil discharged from the main pumps 14L and 14R to the boom cylinder 7 and discharging the hydraulic oil in the boom cylinder 7 to the hydraulic oil tank.

The control valves 176L and 176R respectively supply the hydraulic oil discharged from the main pumps 14L and 14R to the arm cylinder 8 and discharge the hydraulic oil in the arm cylinder 8 to the hydraulic oil tank.

The control valves 171, 172, 173, 174, 175L, 175R, 176L, and 176R adjust the flow rates of hydraulic oil supplied to and discharged from the oil hydraulic actuators and switch the flow directions according to the pilot pressures acting on the pilot ports, respectively.

The parallel oil passage C2L supplies the hydraulic oil of the main pump 14L to the control valves 171, 173, 175L, and 176L in parallel with the center bypass oil passage C1L. Specifically, the parallel oil passage C2L branches from the center bypass oil passage C1L on the upstream side of the control valve 171 and is configured to supply the hydraulic oil of the main pump 14L in parallel with each of the control valves 171, 173, 175L, and 176L. Thus, the parallel oil passage C2L can supply the hydraulic oil to the downstream control valves when the hydraulic oil flow through the center bypass oil passage CIL is restricted or blocked by any of the control valves 171, 173, and 175L.

The parallel oil passage C2R supplies the hydraulic oil of the main pump 14R to the control valves 172, 174, 175R, and 176R in parallel with the center bypass oil passage C1R. Specifically, the parallel oil passage C2R branches from the center bypass oil passage C1R on the upstream side of the control valve 172 and is configured to supply the hydraulic oil of the main pump 14R in parallel with each of the control valves 172, 174, 175R, and 176R. The parallel oil passage C2R can supply the hydraulic oil to the downstream control valves when the hydraulic oil flow through the center bypass oil passage C1R is restricted or blocked by any of the control valves 172, 174, and 175R.

The manually operating system of the shovel 100 according to the present embodiment includes the pilot pump 15 and the manually operating device 26.

The pilot pump 15, for example, is mounted on the rear of the upper swinging body 3 in the same manner as the engine 11, and supplies pilot pressure to the manually operating device 26 via the pilot line 25. The pilot pump 15, for example, is a fixed capacity hydraulic pump and is driven by the engine 11 as described above.

The manually operating device 26 is provided near the cockpit of the cabin 10 and is a manually operating input part for an operator or the like to operate various operation elements (the lower traveling body 1, the upper swinging body 3, the boom 4, the arm 5, the bucket 6, etc.). In other words, the manually operating device 26 is a manually operating input part for operating oil hydraulic actuators (that is, the traveling oil hydraulic motors 1L, 1R, the swinging oil hydraulic motor 2A, the boom cylinder 7, the arm cylinder 8, the bucket cylinders 9, etc.) that drive respective operation elements. The manually operating device 26 includes, for example, four lever devices for operating the upper swinging body 3, the boom 4, the arm 5, and the bucket 6, respectively. The manually operating device 26 also includes, for example, two lever devices or pedal devices for operating the left crawler and the right crawler (that is, the traveling oil hydraulic motors 1L, 1R) of the lower traveling body 1, respectively. The manually operating device 26 is connected to the control valve unit 17 via pilot lines. As a result, pilot signals (pilot pressures) corresponding to the operation states of the lower traveling body 1, the upper swinging body 3, the boom 4, the arm 5, and the bucket 6 in the manually operating device 26 are inputted to the control valve unit 17. Specifically, the pilot pressures of the secondary sides of the two lever devices or the pedal devices that operate the left crawler (traveling oil hydraulic motor 1L) and the right crawler (traveling oil hydraulic motor 1R) respectively act on the pilot ports of the control valves 171, 172. The pilot pressure of the secondary side of the lever device that operates the upper swinging body 3 (traveling oil hydraulic motor 2A) acts on the pilot port of the control valve 173. The pilot pressure of the secondary side of the lever device that operates the boom 4 (boom cylinder 7) acts on the pilot ports of the control valves 175L and 175R. The pilot pressure of the secondary side of the lever device that operates the arm 5 (arm cylinder 8) acts on the pilot ports of the control valves 176L and 176R. The pilot pressure on the secondary side of the lever device for operating the bucket 6 (bucket cylinder 9) acts on the pilot port of the control valve 174. Thus, the control valve unit 17 can drive the respective oil hydraulic actuators according to the operation states of the manually operating device 26.

The control system of the shovel 100 according to the present embodiment includes the controller 30, the regulators 13L and 13R, chokes 18L and 18R for negative control, control pressure sensors 19L and 19R, discharge pressure sensor 28, an operating pressure sensor 29, the display device 40, a manually operating input device as the manually operating part 42, and a communication device 44.

The controller 30 performs driving control of the shovel 100. The controller 30 may be implemented with any hardware or combination of hardware and software. For example, the controller may be configured to have, as a central part, a microcomputer including a CPU (Central Processing Unit), a ROM (Read-Only Memory), a RAM (Random Access Memory), a non-volatile auxiliary storage device, and various input/output interfaces. The controller 30 may implement various functions by executing, on the CPU, various programs stored in, for example, the ROM or the non-volatile auxiliary storage device.

For example, the controller 30 sets a target rotation speed based on a work mode or the like previously set by an operator or the like, and performs drive control for making the engine 11 rotate at a constant speed directly or through a dedicated controller of the engine 11.

For example, the controller 30 controls the regulators 13L and 13R, adjusts the tilt angles of the swash plates of the main pumps 14L and 14R, and thus, controls the discharge amounts of the main pumps 14L and 14R.

Specifically, the controller 30 may control the regulators 13L and 13R and control the discharge amounts of the main pumps 14L and 14R according to the discharge pressures of the main pumps 14L and 14R detected by the discharge pressure sensors 28L and 28R. More specifically, the controller 30 may adjust the swash plate tilt angle of the main pump 14L through the regulator 13L and reduce the discharge amount according to the increase in the discharge pressure of the main pump 14L. The same applies to the regulator 13R. Thus, the controller 30 can control the total horsepower of the main pumps 14L and 14R so that the horsepower absorbed by the main pumps 14L and 14R expressed by the products of the discharge pressures and the discharge amounts does not exceed the output horsepower of the engine 11.

In addition, the controller 30 may control the regulators 13L and 13R and the discharge amounts of the main pumps 14L and 14R according to the detection signals corresponding to the control pressures generated by the chokes 18L and 18R, which are input from the control pressure sensors 19L and 19R. More specifically, the controller 30 reduces the discharge amounts of the main pumps 14L and 14R as the control pressures are larger, and increases the discharge amounts of the main pumps 14L and 14R as the control pressure are smaller.

In a standby state in which none of the oil hydraulic actuators in the shovel 100 are operated (the state shown in FIG. 4), the hydraulic oil discharged from the main pumps 14L and 14R passes through the center bypass oil passages C1L and C1R to the chokes 18L and 18R. The flows of hydraulic oil discharged from the main pumps 14L and 14R increase the control pressures generated upstream of the chokes 18L and 18R. As a result, the controller 30 reduces the discharge amounts of the main pumps 14L and 14R to the allowable minimum discharge amounts, and suppresses the pressure loss (pumping loss) generated when the discharged hydraulic oil passes through the center bypass oil passages C1L and C1R.

On the other hand, when any oil hydraulic actuator is operated by the manually operating device 26, the hydraulic oil discharged from the main pumps 14L and 14R flows into the oil hydraulic actuator that is operated via the control valve corresponding to the oil hydraulic actuator that is operated. The flow of hydraulic oil discharged from the main pumps 14L and 14R reduces or eliminates the amount reaching the chokes 18L and 18R, and reduces the control pressures generated upstream of the chokes 18L and 18R. As a result, the controller 30 can increase the discharge amounts of the main pumps 14L and 14R, circulate sufficient hydraulic oil to the oil hydraulic actuator that is operated, and reliably drive the oil hydraulic actuator that is operated.

Thus, the controller 30 can suppress the wasteful energy consumption of the main pumps 14L and 14R, including the pumping loss caused by the hydraulic oil discharged from the main pumps 14L and 14R in the center bypass oil passages C1L and C1R, in the standby state of the hydraulic drive system. When the oil hydraulic actuator is operated, the controller 30 can supply the necessary and sufficient hydraulic oil from the main pumps 14L and 14R to the oil hydraulic actuator that is operated.

In addition, when a combined operation (hereinafter, simply referred to as a "combined operation") in which two oil hydraulic actuators are operated simultaneously by the manually operating device 26 is performed, the controller 30 controls the regulators 13L and 13R so that the two oil hydraulic actuators operate in accordance with preset contents, and controls the discharge amounts of the main pumps 14L and 14R. More specifically, the controller 30 controls the regulators 13L and 13R so that the flow rate distribution of the hydraulic oil supplied to the two oil hydraulic actuators is adjusted to preset contents during the combined operation by the manually operating device 26. For example, in a combined operation (hereinafter, referred to as a "boom lifting swinging operation") in which the operation in the upward direction of the boom 4 (hereinafter, referred as a "boom lifting operation") and a swinging operation of the upper swinging body 3 are performed simultaneously, the swinging oil hydraulic motor 2A driven by hydraulic oil supplied from the main pump 14L and the boom cylinder 7 supplied with hydraulic oil from both the main pumps 14L and 14R operate. In this case, since the hydraulic oil flows into the swinging oil hydraulic motor 2A from the upstream side (the main pump 14L side) of the boom cylinder 7 in the center bypass oil passage C1L, the controller 30 can relatively increase the flow rate of the swinging oil hydraulic motor 2A by increasing the discharge rate of the main pump 14L. On the other hand, since the boom cylinder 7 can receive the supply of hydraulic oil not only from the main pump 14L but also from the main pump 14R, the controller 30 can relatively increase the flow rate of the boom cylinder 7 by increasing the discharge rate of the main pump 14R. In this way, the controller 30 can adjust the flow rate of hydraulic oil supplied to the two oil hydraulic actuators to the contents that are set as described below by controlling the discharge rates of the main pumps 14L and 14R during the combined operation based on the operation state of the manually operating device 26.

For example, the controller 30 sets a relative degree of responses (hereinafter, referred to as "relative reactivity") of the two oil hydraulic actuators with respect to an operation input to the manually operating device 26 during the combined operation in accordance with the operation of the manually operating part 42 by a user such as an operator or a service person. The controller 30 includes, for example, a manually operating screen page display processing part 301 and a combined operation setting part 302 as functional parts related to a setting (hereinafter, referred to as a relative reactivity setting) of the relative responses of the two oil hydraulic actuators during the combined operation realized by executing one or more programs stored in a non-volatile auxiliary storage device. The controller 30 also includes, for example, a storage part 303 as a storage area related to the relative response setting defined in a non-volatile internal memory such as an auxiliary storage device.

Some of the functions of the controller 30 may be realized by other controllers. That is, the functions of the controller 30 may be realized in a manner of being distributed to a plurality of controllers.

The regulators 13L and 13R adjust the discharge amounts of the main pumps 14L and 14R by adjusting the tilt angles of the swash plates of the main pumps 14L and 14R, respectively, under the control of the controller 30.

The chokes 18L and 18R are provided between the most downstream control valves 176L and 176R in the center bypass oil passages C1L and C1R and the hydraulic oil tank. Thus, the flows of the hydraulic oil discharged by the main pumps 14L and 14R are restricted by the chokes 18L and 18R, and the chokes 18L and 18R generate the control pressures described above.

The control pressure sensors 19L and 19R detect the control pressures, and the detection signals corresponding to the detected control pressures are input to the controller 30.

The discharge pressure sensors 28L and 28R detect the discharge pressures of the main pumps 14L and 14R, respectively, and the detection signals corresponding to the detected discharge pressures are input to the controller 30.

The operating pressure sensors 29 detect the pilot pressures on the secondary side of the manually operating device 26, that is, the pilot pressures corresponding to the operation states of the respective operation elements (the oil hydraulic actuators) of the manually operating device 26. The detection signals of the pilot pressures corresponding to the operation states of the lower traveling body 1, the upper swinging body 3, the boom 4, the arm 5, the bucket 6, etc. in the manually operating device 26 detected by the operating pressure sensors 29 are input to the controller 30.

The display device 40 is provided at a place in the cabin 10 near the cockpit where the operator can easily see (for example, a right front pillar portion or the like in the cabin 10), and displays various information screen pages under the control of the controller 30. The display device 40 is, for example, a liquid crystal display or an organic EL (Electro Luminescence) display, and may be of a touch panel type that functions also as a manually operating part.

The manually operating part 42 is provided within reach from a seated operator or the like in the cabin 10, and receives various operations of the operator or the like. The manually operating part 42 includes a touch panel mounted on the display of the display device 40 for displaying various information images, a touch pad provided separately from the display of the display device 40, a knob switch provided at an extending end of a lever part of a lever device included in the manually operating device 26, a button switch, a lever, a toggle, and the like provided around the display device 40 or arranged relatively far from the display device 40. Signals corresponding to operation content with respect to the manually operating part 42 are input to the controller 30.

The communication device 44 connects to a communication network external to the shovel 100, which may be, for example, a mobile communication network whose terminal is a base station, a satellite communication network utilizing communication satellites in the sky, the Internet, or the like, and communicates with an external device.

Figure 5:
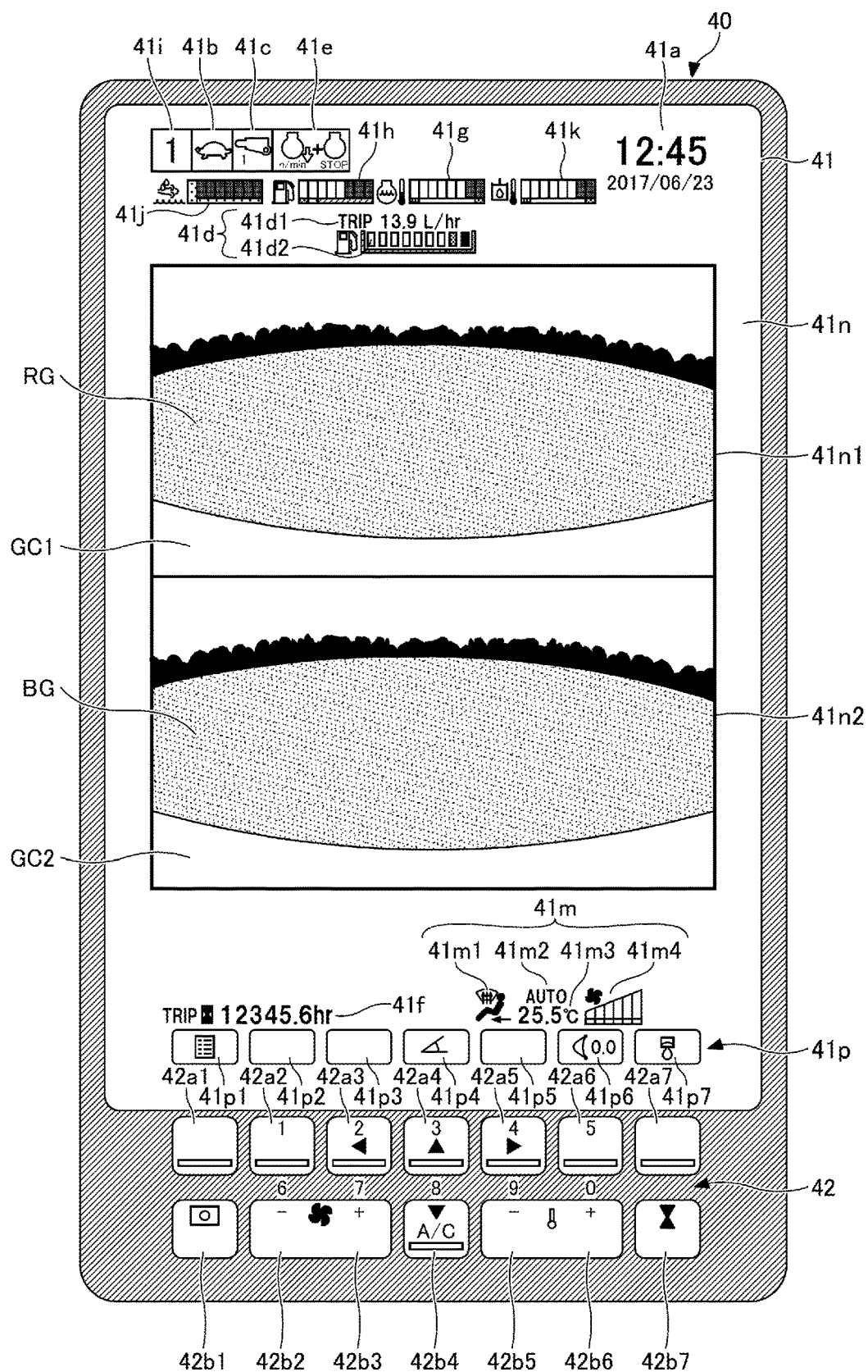
FIG. 5 is a diagram showing an example of a configuration of an image display part and a manually operating part of the display device.

Next, a configuration example of the image display part 41 and the manually operating part 42 of the display device 40 will be described with reference to FIG. 5. FIG. 5 is a diagram showing a configuration example of the image display part 41 and the manually operating part 42 of the display device 40. In the example of FIG. 5, the image display part 41 shows a state in which a home screen page including a right image and a rear image is displayed as a screen page displayed before a menu switch of the manually operating part 42 is operated. The home screen page is a screen page displayed during operation of the shovel 100.

First, the image display part 41 will be described. As shown in FIG. 5, the image display part 41 includes a date and time display area 41a, a driving mode display area 41b, an attachment display area 41c, a fuel consumption display area 41d, an engine control state display area 41e, an engine operating time display area 41f, a cooling water temperature display area 41g, a fuel remaining amount display area 41h, an engine speed level display area 41i, an urea water remaining amount display area 41j, a hydraulic oil temperature display area 41k, an air conditioner operating state display area 41m, an image display area 41n, and a menu display area 41p.

The driving mode display area 41b, the attachment display area 41c, the engine control state display area 41e, the engine speed level display area 41i, and the air conditioner operating state display area 41m are areas for displaying setting state information that is information about the setting state of the shovel 100. The fuel consumption display area 41d, the engine operating time display area 41f, the cooling water temperature display area 41g, the fuel remaining amount display area 41h, the urea water remaining amount display area 41j, and the hydraulic oil temperature display area 41k are areas for displaying operating state information that is information about the operating state of the shovel 100.

Specifically, the date and time display area 41a is an area for displaying the current date and time. The driving mode display area 41b is an area for displaying the current driving mode. The attachment display area 41c is an area for displaying an image representing the currently installed attachment. The fuel consumption display area 41d is an area for displaying fuel consumption information calculated by the controller 30. The fuel consumption display area 41d includes an average fuel consumption display area 41d1 for displaying lifetime average fuel consumption or zonal average fuel consumption, and an instantaneous fuel consumption display area 41d2 for displaying instantaneous fuel consumption.

The engine control state display area 41e is an area for displaying the control state of the engine 11. The engine operating time display area 41f is an area for displaying the cumulative operating time of the engine 11. The cooling water temperature display area 41g is an area for displaying the current temperature state of the engine cooling water. The fuel remaining amount display area 41h is an area for displaying the remaining fuel amount state of fuel stored in the fuel tank. The engine speed level display area 41i is an area for displaying as an image the current level that is set by the dial 75. FIG. 5 shows a state in which the first level is selected. The urea water remaining amount display area 41j is an area in which the remaining amount state of urea water stored in a urea water tank is displayed as an image. The hydraulic oil temperature display area 41k is an area in which the temperature state of the hydraulic oil in the hydraulic oil tank is displayed.

The air conditioner operating state display area 41m includes an air outlet display area 41m1 for displaying the current position of the air outlet, an operating mode display area 41m2 for displaying the current operating mode, a temperature display area 41m3 for displaying the current set temperature, and an air flow display area 41m4 for displaying the current set air flow.

The image display area 41n is an area for displaying an image captured by an image capturing device 80. In the example of FIG. 5, the image display area 41n displays a right image RG and a rear image BG. The right image RG is an image of a space on the right side of the shovel 100 and includes an image GC1 of the right end of the upper surface of the upper swinging body 3. The right image RG is a real viewpoint image generated by the control part 40a and is generated based on an image acquired by the right camera 80R. The rear image BG is an image of a space behind the shovel 100 and includes a counterweight image GC2. The rear image BG is a real viewpoint image generated by the control part 40a and is generated based on the image acquired by the rear camera 80B.

The image display area 41n includes a first image display area 41n1 located above and a second image display area 41n2 located below. In the example of FIG. 5, the right image RG is arranged in the first image display area 41n1 and the rear image BG is arranged in the second image display area 41n2. However, the image display area 41n may be configured to display a bird's eye view image. The bird's eye view image is a virtual viewpoint image generated by the control part 40a, and is generated based on images acquired by the rear camera BOB, the left camera 80L, and the right camera 80R. A shovel figure corresponding to the shovel 100 is arranged in the center of the bird's eye view image. This is to make the operator intuitively understand the positional relationship between the shovel 100 and an object existing around the shovel 100. The image display area 41n may be configured to simultaneously display at least two from among the bird's eye view image, the left image, the right image RG, and the rear image BG.

For example, in the image display area 41n, the bird's eye view image may be arranged in the first image display area 41n1, and the rear image BG and the right image RG may be arranged in the second image display area 41n2. In this case, the rear image BG may be arranged at the left side in the second image display area 41n2, and the right image RG may be arranged at the right side in the second image display area 41n2.

Alternatively, the image display area 41*n* may arrange the left image and the right image RG in the first image display area 41*n*1, and arrange the rear image BG in the second image display area 41*n*2. In this case, the left image may be arranged at the left side in the first image display area 41*n*1, and the right image RG may be arranged at the right side in the first image display area 41*n*1.

In the example of FIG. 5, the right image RG and the rear image BG may be arranged adjacent to each other vertically, but may be spaced apart from one another. In the example of FIG. 5, the image display area 41*n* is a vertically elongated area, but the image display area 41*n* may be a horizontally elongated area. When the image display area 41*n* is a horizontally elongated area, the image display area 41*n* may have the rear image BG as the first image display area 41*n*1 at the left side, and the right image RG as the second image display area 41*n*2 at the right side. In this case, the rear image BG and the right image RG may be spaced apart horizontally, and the positions of the rear image BG and the right image RG may be interchanged therebetween.

The menu display area 41*p* has tabs 41*p*1-41*p*7. In the example shown in FIG. 5, the tabs 41*p*1-41*p*7 are arranged at the bottom of the image display part 41 being spaced apart from each other horizontally. Icons for displaying various kinds of information are displayed in the tabs 41*p*1-41*p*7.

A menu detail item icon for displaying menu detail items is displayed in the tab 41*p*1. When the operator selects the tab 41*p*1, icons displayed in the tab 41*p*2-41*p*7 are switched to icons associated with menu detail items.

The tab 41*p*4 displays an icon for displaying information about a digital level. When the tab 41*p*4 is selected by the operator, the rear image BG displayed in the second image display area 41*n*2 is switched to a screen page showing information about the digital level. Then, the right image RG displayed in the first image display area 41*n*1 is reduced in size and the first image display area 41*n*1 is switched to display a combination of the right image RG and the rear image BG. However, the screen page showing information about the digital level may be displayed in a state of superimposing the rear image BG or reducing the size of the rear image BG. The right image RG may be switched to the screen page showing information about the digital level, or the screen page showing information about the digital level may be displayed in a state of superimposing the right image RG or reducing the size of the right image RG. When the right image RG displayed in the first image display area 41*n*1 is switched to the screen page showing information about the digital level, the rear image BG displayed in the second image display area 41*n*2 may be reduced in size and the second image display area 41*n*2 may be switched to display a combination of the right image RG and the rear image BG.

The tab 41*p*6 displays an icon for displaying information about digital representation of things around the construction site. When the tab 41*p*6 is selected by the operator, the rear image BG displayed in the second image display area 41*n*2 is switched to a screen page showing information about digital representation of things around the construction site. Then, the right image RG displayed in the first image display area 41*n*1 is reduced in size and the first image display area 41*n*1 is switched to display a combination of the right image RG and the rear image BG. However, in a state of superimposing the rear image BG or reducing the size of the rear image BG, the screen page showing information about digital representation of things around the construction site may be displayed. Further, the right image RG may be switched to the screen page showing information about digital representation of things around the construction site, or the screen page showing information about digital representation of things around the construction site may be displayed in a state of superimposing the right image RG or reducing the size of the right image RG. When the right image RG displayed in the first image display area 41*n*1 is switched to the screen page showing information about digital representation of things around the construction site, the rear image BG displayed in the second image display area 41*n*2 may be reduced in size and the second image display area 41*n*2 may be switched to display a combination of the right image RG and the rear image BG.

An icon for displaying information on a crane mode is displayed in the tab 41*p*7. When the tab 41*p*7 is selected by the operator, the rear image BG displayed in the second image display area 41*n*2 is switched to a screen page showing information on the crane mode. Then, the right image RG displayed in the first image display area 41*n*1 is reduced in size and the first image display area 41*n*1 is switched to display a combination of the right image RG and the rear image BG. However, the screen page showing information about the crane mode may be displayed in a state of superimposing the rear image BG or reducing the size of the rear image BG. The right image RG may be switched to the screen page showing information about the crane mode, or the screen page showing information about the crane mode may be displayed in a state of superimposing the right image RG or reducing the size of the right image RG. When the right image RG displayed in the first image display area 41*n*1 is switched to the screen page showing information about the crane mode, the rear image BG displayed in the second image display area 41*n*2 may be reduced in size and the second image display area 41*n*2 may be switched to display a combination of the right image RG and the rear image BG.

The tabs 41*p*2, 41*p*3, 41*p*5 do not have icons. Therefore, even if any one of the tabs 41*p*2, 41*p*3, 41*p*5 is operated by the operator, the image displayed on the image display part 41 does not change.

Note that the icons displayed in tabs 41*p*1-41*p*7 are not limited to those of the above example, and icons for displaying other information may be displayed instead.

Next, the manually operating part 42 will be described. As shown in FIG. 5, the manually operating part 42 includes one or more button switches for performing selection and setting inputs of the tabs 41*p*1-41*p*7 by the operator. In the example of FIG. 5, the manually operating part 42 includes seven switches 42*a*1-42*a*7 arranged in an upper row and seven switches 42*b*1-42*b*7 arranged in a lower row. The switches 42*b*1-42*b*7 are arranged below the switches 42*a*1-42*a*7, respectively. However, the number, configuration, and arrangement of the switches of the manually operating part 42 are not limited to those of the above example, and may be configured with combining the functions of a plurality of button type switches using, for example, a jog wheel, a jog switch, or the like, or the manually operating part 42 may be separate from the display device 40. Alternatively, the tabs 41*p*1-41*p*7 may be directly operated by a touch panel in which the image display part 41 and the manually operating part 42 are integrated.

The switches 42*a*1-42*a*7 are disposed below the tab 41*p*1-41*p*7 at positions corresponding to those the tabs 41*p*1-41*p*7, and function as switches for selecting the tabs 41*p*1-41*p*7. Since the switches 42*a*1-42*a*7 are disposed below the tabs 41*p*1-41*p*7 at positions corresponding to those of the tabs 41*p*1-41*p*7, the operator can intuitively select any one of the tabs 41*p*1-41*p*7.

The switch 42b1 is a switch to switch a captured image displayed in the image display area 41n. Each time the switch 42b1 is operated, the captured image displayed in the first image display area 41n1 of the image display area 41n switches to the next among, for example, the rear image, the left image, the right image, and the bird's eye image. In addition, each time the switch 42b1 is operated, the captured image displayed in the second image display area 41n2 of the image display area 41n may switch to the next among, for example, the rear image, the left image, the right image, and the bird's eye image. In addition, each time the switch 42b1 is operated, the captured image displayed in the first image display area 41n1 of the image display area 41n and the captured image displayed in the second image display area 41n2 may switch therebetween. In this manner, the switch 42b1 as the manually operating part 42 may switch the screen page displayed in the first image display area 41n1 or the second image display area 41n2, or may switch the screen pages displayed in the first image display area 41n1 and the second image display area 41n2. Another switch for switching the screen page displayed in the second image display area 41n2 may also be provided.

The switches 42b2 and 42b3 are switches for adjusting the air flow of the air conditioner. In the example shown in FIG. 5, the air flow of the air conditioner decreases when the switch 42b2 is operated, and increases when the switch 42b3 is operated.

The switch 42b4 is a switch for switching turning on and off of the cooling and heating functions. In the example shown in FIG. 5, the cooling or heating function is turned from on to off or off to on each time the switch 42b4 is operated.

The switches 42b5 and 42b6 are switches for adjusting the set temperature of the air conditioner. In the example shown in FIG. 5, the set temperature decreases when the switch 42b5 is operated, and increases when the switch 42b6 is operated.

The switch 42b7 is a switch for switching the display contents of the engine operating time display area 41f.

In addition, the switches 42a2-42a6 and 42b2-42b6 are configured to enable input of numbers indicated on or near the respective switches. In addition, the switches 42a3, 42a4, 42a5, and 42b4 are configured to enable a cursor to be moved to the left, up, right and down, respectively, when the cursor is displayed in the menu screen page.

The functions of the switches 42a1-42a7 and 42b1-42b7 are examples, and the switches 42a1-42a7 and 42b1-42b7 may be configured to have other functions.

As described above, when the tab 41p1 is selected while the right image RG and the rear image BG are displayed in the image display area 41n, the first menu detail items are displayed in the tabs 41p2-41p7 in a state in which the right image RG and the rear image BG are kept being displayed. Therefore, the operator can check the first menu detail items while checking the right image RG and the rear image BG.

As described above, in the above-described example, when any of the tabs 41p2-41p7 is selected in a state in which the right image RG and the rear image BG are kept being displayed in the image display area 41n, the rear image BG is switched to a menu screen page showing information corresponding to the selected one of the tabs 41p2-41p7. At this time, the display of the right image RG is switched to a combination of the right image RG and the rear image BG. Thus, since the menu screen page is displayed in the state in which the right image RG and the rear image BG are kept being displayed, the peripheral vision can be secured even in the state in which the menu screen page is displayed. Therefore, it is possible to operate the shovel 100 in the state in which the menu screen page is kept being displayed.

Figure 6:
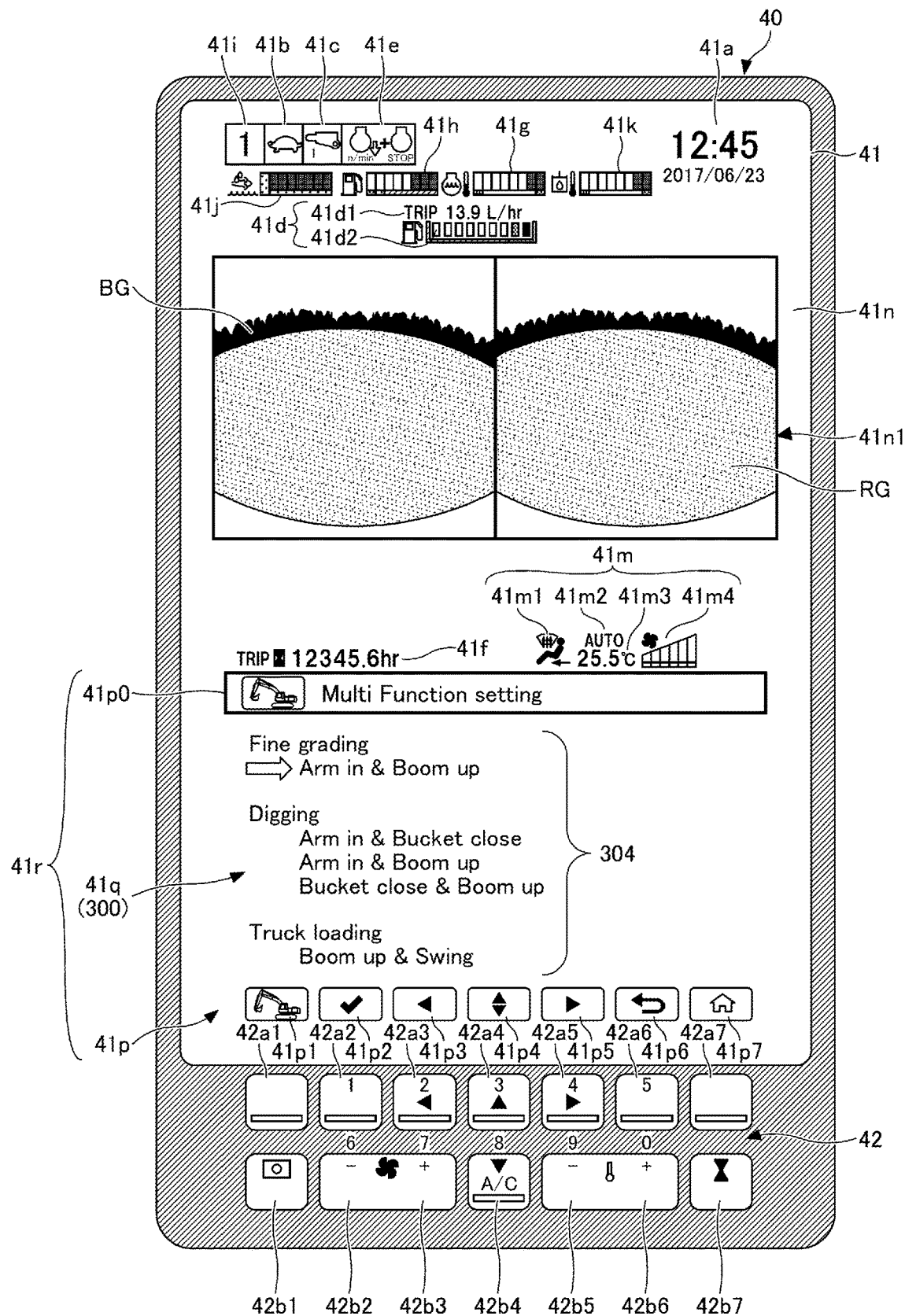
FIG. 6 is a diagram showing another example of the configuration of the image display part and the manually operating part of the display device.

Next, another configuration example of the image display part 41 and the manually operating part 42 of the display device 40 will be described with reference to FIG. 6. FIG. 6 is a diagram showing a configuration example of the image display part 41 and the manually operating part 42 of the display device 40. The screen page displayed in the image display part 41 of FIG. 6 is displayed when, for example, a tab (not shown; one of the tabs 41p1-41p7 of FIG. 5) in which a machine information icon is displayed is selected.

In the example of FIG. 6, the image display part 41 mainly displays the rear image BG, the right image RG, an image 41q showing machine information, and a plurality of tabs 41p0-41p7.

In the example of FIG. 6, the image 41q showing machine information displays a selection screen page (a setting target combined operation selection screen page) for selecting, from among a plurality of predetermined types of combined operations, a combined operation of a type of a relative reactivity setting target that is selected using a relative reactivity setting screen page. However, the menu screen page is not limited to this example and may include other information.

The tab 41p0 displays a first machine information icon, which is an icon indicating currently selected machine information.

The tab 41p1 displays a first operability setting icon for displaying a first operability setting. When the tab 41p1 is selected by the operator, the icons associated with the first machine information displayed in the tabs 41p2-41p7 are switched to icons associated with the first operability setting. The tab 41p1 may also display a second machine information icon for displaying second machine information.

The tabs 41p2-41p6 display icons for selecting, moving, and canceling items shown in the image 41q showing machine information. When any of the tabs 41p2-41p6 is selected by the operator, an item is selected, moved, or canceled.

A home icon for displaying a preset home screen page (for example, a default screen page) is displayed in the tab 41p7. When the tab 41p7 is selected by the operator, the preset home screen page is displayed. For example, the screen page shown in FIG. 5 is displayed as the home screen page.

In the example shown in FIG. 6, the image 41q showing machine information is an example of the menu screen page.

As described above, when a certain tab is selected in a state in which the right image RG and the rear image BG are kept being displayed in the image display area 41n, the rear image BG displayed in the second image display area 41n2 shown in FIG. 5 is switched to a menu screen page showing machine information corresponding to the selected tab, and the right image RG displayed in the first image display area 41n1 shown in FIG. 5 is switched to a combination of the right image RG and the rear image BG. Specifically, as shown in FIG. 6, the engine operating time display area 41f, the air conditioner operating state display area 41m, an area where the image 41q showing machine information is displayed, and the menu display area 41p are arranged in the portion where the second image display area 41n2, the engine operating time display area 41f, the air conditioner operating state display area 41m, and the menu display area 41p shown in FIG. 5 have been arranged. More specifically, the engine operating time display area 41f, the air conditioner operating state display area 41m, and the tab 41p0 are arranged above the area where the image 41q showing machine information is displayed. Hereinafter, an area 41*r* is an area that includes an area where the tab 41*p*0 is displayed; an area where the image 41*q* showing machine information is displayed; and the menu display area 41*p*. Thus, since the menu screen page showing machine information is displayed in a state where the right image RG and the rear image BG are kept being displayed, the operator can operate the shovel 100 while checking the various settings.

Next, a specific example of the relative reactivity setting screen page will be described with reference to FIGS. 6 to 7.

An image 41*q* shown in FIG. 6 shows an example (the setting target combined operation selection screen page 300) of a selection screen page (setting target combined operation selection screen page) for selecting, from among a plurality of predetermined types of combined operations, a combined operation of a type of a relative reactivity setting target that is selected using a relative reactivity setting screen page, displayed on the display device 40 of the shovel 100 as described above.

For example, when a predetermined screen page transition option (for example, a button icon) displayed on a predetermined screen page (for example, the home screen page) displayed on the display device 40 is operated through the manually operating part 42, the manually operating screen page display processing part 301 may cause the display contents of the display device 40 to transition to the setting target combined operation selection screen page 300. For example, the manually operating screen page display processing part 301 may cause the display contents of the display device 40 to transition to the setting target combined operation selection screen page 300 in response to user's operation on a registered contents call-up screen page for using registered contents such as a current setting 3030, an initial setting 3031, and a custom setting 3032 described later. Note that the current setting 3030 means registered contents (present values of one or more parameters) currently being used, an initial setting 3031 means initially registered contents (initial values of the one or more parameters), and a custom setting means registered contents (registered values of the one or more parameters) that can be called up at a desired timing. The operator can return the current setting 3030 to the initial setting 3031 by performing a predetermined reset operation.

As shown in the image 41*q* in FIG. 6, the setting target combined operation selection screen page 300 includes a list 304 of a plurality of types of combined operations, from which selection can be made, arranged in the center portion in the vertical direction. Further, the setting target combined operation selection screen page 300 includes button icons (tabs 41*p*2-41*p*5) arranged horizontally at the lower end portion for operating a cursor.

The list 304 includes, as a selectable type of a combined operation, a combined operation ("Arm in & Boom up") (hereinafter, referred to as an "arm closing boom lifting operation") that is a combination of a closing operation of the arm 5 (hereinafter, referred to as an "arm closing operation") and a boom lifting operation at a time of a leveling work ("Fine grading"). The list 304 also includes, as a selectable type of a combined operation, a combined operation ("Arm in & Bucket close") (hereinafter, referred to as an "arm closing bucket closing operation") that is a combination of a closing operation of the arm and a closing operation of the bucket 6 (hereinafter, referred to as a "bucket closing operation") at a time of an excavation work ("Digging"). Also included in the list 304 is an arm closing boom lifting operation ("Bucket close & Boom up") at a time of an excavation work as a selectable type of a combined operation. Also included in the list 304 is a combined operation (hereinafter, referred to as a "bucket closing boom lifting operation") that is a combination of a bucket closing operation and a boom lifting operation at a time of excavation work as a selectable type of a combined operation. Also included in the list 304 is a boom lifting swinging operation ("Boom up & Swing") at a time of loading earth and sand or the like onto a truck ("Truck loading") as a selectable type of a combined operation.

In this example, a different relative reactivity between the arm cylinder 8 and the boom cylinder 7 can be set between an arm closing boom lifting operation at a time of leveling work and an arm closing boom lifting operation at a time of an excavation work. In this case, the controller determines the work content of the shovel 100 and controls the flow distribution to the arm cylinder 8 and the boom cylinder 7 based on the current setting 3030 corresponding to the work content in accordance with whether the determined work content is an excavation work or a leveling work. Specifically, the controller 30 can determine whether an excavation work or a leveling work is performed, using, for example, a measured value of the cylinder pressure of the boom cylinder 7 or an image of a camera capturing an image of the front of the shovel 100. The controller 30 may also determine whether an excavation work or a leveling work is performed in accordance with the user's operation of a switch or the like included in the manually operating part 42 for selecting a work type.

The user can move a cursor (for example, the color of the name of a selectable type of a combined operation changing to a different color, or an arrow being displayed) up and down by operating a button icon (the tab 41*p*4) through the manually operating part 42 to select a desired type of combined operation. Then, in the state in which the desired type of combined operation has been thus selected by the cursor, the user finally sets the selected type of combined operation by operating a button icon (the tab 41*p*2) through the manually operating part 42.

When the type of combined operation is thus set, the manually operating screen page display processing part 301 transitions the display contents of the display device 40 to the display contents including the relative reactivity setting screen page (for example, the relative reactivity setting screen page 400 described later) concerning the selected type of combined operation.

In the present embodiment, the controller 30 displays the relative reactivity setting screen page in the area 41*r* shown in FIG. 6. Specifically, the controller 30 displays the relative reactivity setting screen page 400 or an information image 550, which will be described later, in an area where the image 41*q* showing the machine information shown in FIG. 6 is displayed and in the menu display area 41*p*. However, the controller 30 may be configured to display the relative reactivity setting screen page 400 or the information image 550 or the like in a full-screen display manner.

Instead of the cursor, a touch panel mounted on the display device 40 may be used to select any one of various items. The same applies to the relative reactivity operation screen page shown in FIG. 7.

Figure 7:
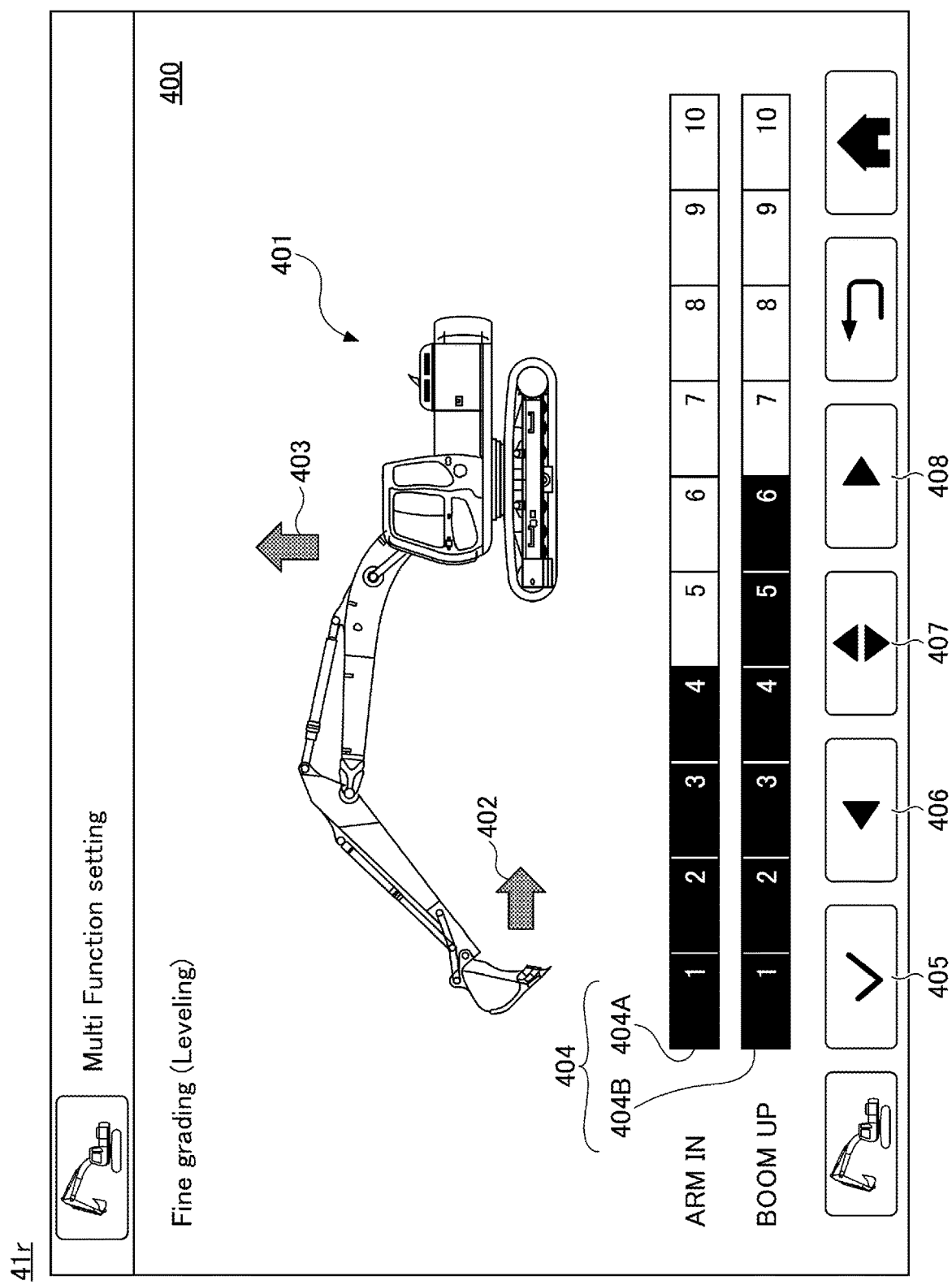
FIG. 7 is a diagram showing an example of a configuration of a relative reactivity setting screen page.

FIG. 7 is a diagram showing a specific example of the relative reactivity setting screen page.

FIG. 7 is a diagram showing a first example of the relative reactivity setting screen page (i.e., the relative reactivity setting screen page 400). Specifically, FIG. 7 is a diagram showing an example of the relative reactivity setting screen page (the relative reactivity setting screen page 400) for an arm closing boom lifting operation in a leveling work.

As shown in FIG. 7, the relative reactivity setting screen page 400 includes an image (hereinafter, referred to as a "shovel image") 401 of the shovel 100 arranged in the center portion and imitating a combined operation of a type of setting target (an arm closing boom lifting operation in a leveling work). The relative reactivity setting screen page 400 also includes arrow icons 402 and 403 arranged adjacent to respective portions corresponding to the arm 5 and the boom 4 of the shovel image 401 and imitating an arm closing operation and a boom lifting operation, respectively. The relative reactivity setting screen page 400 also includes a bar graph 404 arranged below the shovel image 401 and showing relative reactivity between the arm cylinder 8 and the boom cylinder 7. The relative reactivity setting screen page 400 also includes button icons 405-408 arranged horizontally at the lower end for performing a cursor operation, similar to the setting target combined operation selection screen page 300.

The bar graph 404 includes a bar graph 404A showing the relative reactivity of the arm cylinder 8 corresponding to the arm closing operation and a bar graph 404B showing the relative reactivity of the boom cylinder 7 corresponding to the boom lifting operation. The bar graphs 404 A and 404B are arranged side by side vertically and each arranged horizontally with respect to the relative reactivity setting screen page 400.

In this example, the bar graphs 404 A and 404B are displayed in 10 levels each. The bar graphs 404 A and 404B are displayed in such a manner that each is in a range from "level 1" to "level 9", and the sum of both graphs is "level 10". In the initial setting, for example, the bar graph 404 A indicates "level 5" and the bar graph 404B indicates "level 5". In the state shown in FIG. 7, the bar graph 404 A indicates "level 4" and the bar graph 404B indicates "level 6", indicating that the operation of the boom cylinder 7 is slightly prioritized with respect to the operation of the arm cylinder 8. Thus, since the user can easily visually (intuitively) check the relative reactivity of the two oil hydraulic actuators (the arm cylinder 8 and the boom cylinder 7), the user can easily set the relative reactivity.

For example, the user can move the cursor (for example, resulting in that the letters "ARM IN" and "BOOM UP" appended to the respective bar graphs 404 A and 404B change to different colors) up or down by operating the button icon 407 through the manually operating part 42 and select one of the bar graphs 404 A and 404B. With one of the bar graphs 404 A and 404B selected, the user can increase the level of the selected bar graph, one step by one step, by operating the button icon 408 through the manually operating part 42 and decrease the level of the selected bar graph, one step by one step, by operating the button icon 406. At this time, the manually operating screen page display processing part 301 automatically decreases or increases the level of the other bar graph not selected in accordance with the increase or decrease of the level of the selected bar graph and maintains the state in which the sum of both is "level 10". As a result, since the user does not need to perform a change operation of the level of the other bar graph not selected, the controller 30 can improve the convenience of the user.

It is also possible that the manually operating screen page display processing part 301 changes the display of either one of bar graphs 404A and 404B to the level in accordance with a touch operation or the like in response to the touch operation or the like being performed by the user on the level of the one of the bar graphs 404A and 404B through the touch panel or the like as the manually operating part 42, and changes the display of the other bar graph in such a manner that the sum of the displays of the bar graphs after the change is maintained as "level 10". Thus, since the user can directly set the step of the bar graphs 404 A, 404B through the touch panel, the controller 30 can further improve the convenience of the user.

It is also possible that the manually operating screen page display processing part 301 increases the level of corresponding one of the bar graphs 404A and 404B and decreases the level of the other bar graph in response to an operation (for example, a touch operation, etc.) being performed on either of the arrow icons 402 and 403 through the touch panel or the like as the manually operating part 42. Thus, since the user can intuitively easily confirm whether the arm closing operation or the boom lifting operation is selected thanks to the arrow icon 402 or 403 appended to the shovel image 401, the relative reactivity can be changed while the user can confirm the operation to be prioritized, and the controller 30 can further improve the convenience of the user.

It is also possible that the manually operating screen page display processing part 301 increases the level of one corresponding bar graph of the bar graphs 404A and 404B and decreases the level of the other bar graph in response to an operation (for example, the touch operation, etc.) on a part of an operation element (that is, the arm 5 or the boom 4) that is driven by the corresponding one of the two oil hydraulic actuators corresponding to the combined operation of the setting target in the shovel image 401 through the touch panel or the like as the manually operating part 42. Thus, the user can intuitively easily understand from the shovel image 401 whether the arm closing operation or the boom lifting operation is selected. Therefore, as in the case where the operation is performed on the arrow icon 402 or 403, the relative reactivity can be changed while the user can confirm the operation to be prioritized, and the controller 30 can further improve the convenience of the user.

It is also possible that the sizes of the corresponding arrow icons 402 and 403 change according to the changes in the levels of the bar graphs 404A and 404B. Specifically, the manually operating screen page display processing part 301 may increase the size of the arrow icon 402 corresponding to the arm closing operation according to an increase in the level of the bar graph 404A corresponding to the arm closing operation, and decrease the size of the arrow icon 402 according to a decrease in the level of the bar graph 404A. It is also possible that the manually operating screen page display processing part 301 increases the size of the arrow icon 403 corresponding to the boom lifting operation according to an increase in the level of the bar graph 404B corresponding to the boom lifting operation, and decrease the size of the arrow icon 403 according to a decrease in the level of the bar graph 404B. Thus, the user can more easily visually confirm the relationship of the relative reactivity between the two oil hydraulic actuators, and can more easily change the setting of the relative reactivity.

Then, the user can finally set the relative reactivity of the arm cylinder 8 and the boom cylinder 7 corresponding to the display contents of the bar graphs 404 A and 404B by operating the button icon 405 through the manually operating part 42 in the state in which the levels of the bar graphs 404A and 404B have been changed to the desired contents. At this time, the combined operation setting part 302 stores the relative reactivity of the arm cylinder 8 and the boom cylinder 7 corresponding to the display contents of the bar graphs 404A and 404B with respect to a time of the arm closing boom lifting operation of the leveling work in the storage part 303 as the current setting 3030.

In response to the type of the registered contents to be called up being finally set, the manually operating screen page display processing part 301 transitions the display contents of the display device 40 to the setting target combined operation selection screen page in a state in which the finally set type of the registered contents is stored. In response to the combined operation that is the setting target being finally set in response to the operation by the user through the manually operating part 42 as described above, the manually operating screen page display processing part 301 calls up (reads) the stored type of the registered contents from the storage part 303 and transitions the display contents of the display device 40 to the relative reactivity setting screen page that reflects the registered contents. Thus, the user can set the relative reactivity to the registered contents selected through the registered contents call-up screen page by performing the finally setting operation through the manually operating part 42 on the relative reactivity setting screen page in the state in which the registered contents (the initial setting 3031 or the custom setting 3032) selected by the user are reflected.

In the case of the custom setting, there is a possibility that all the types of the combined operations for being set have not been registered. Therefore, for example, when only the contents of one type of combined operation have been registered as a certain type of custom setting, the manually operating screen page display processing part 301 may, in response to the corresponding custom setting being called up, avoid changing the display contents of the display device 40 to the setting target combined operation selection screen page, and directly change the display contents to the relative reactivity setting screen page with respect to the corresponding type of combined operation. It is also possible that, for example, when only the contents of some types of combined operations for being set have been registered as a certain type of custom setting, the manually operating screen page display processing part 301, in response to the corresponding custom setting being called up, hides the types of combined operations that have not been registered as the custom setting in the setting target combined operation selection screen page, or displays them in a state where operation thereon is not permitted.

A combined operation setting part 302 (an example of a setting part) sets relative reactivity of two oil hydraulic actuators with respect to a time of a combined operation, for each of a plurality of types of combined operations, in response to an operation on the relative reactivity setting screen page by a user performed through an operation input device as the manually operating part 42. The operation on the relative reactivity setting screen page may be not only an operation using a touch panel with which it is possible to directly operate the setting screen page, but also, as a matter of course, an operation on an operation target such as a cursor or an icon on the operation screen page through any hardware that may be included in the manually operating input device described above. The relative reactivity of two oil hydraulic actuators with respect to a combined operation is a distribution of speeds of operations of the two oil hydraulic actuators when the two oil hydraulic actuators are operated at the same time, and when either one is increased, the other is decreased in a trade-off relationship. More specifically, the relative reactivity of the two oil hydraulic actuators with respect to a combined operation, that is, the speeds of operations of the two oil hydraulic actuators in a trade-off relationship may be respective reaction times from operations of the two oil hydraulic actuators to actual starts of the operations when the two oil hydraulic actuators are operated at the same time, the respective operation speeds of the two oil hydraulic actuators, the operation accelerations, or the like. In other words, the relative reactivity of the two oil hydraulic actuators with respect to a combined operation is the relative priority as to which of the two oil hydraulic actuators should be operated with higher priority. The relative reactivity of the two oil hydraulic actuators can be changed, for example, by adjusting the flow distribution of hydraulic oil supplied to the two oil hydraulic actuators. In other words, the combined operation setting part 302 may set the flow distribution of hydraulic oil to the two oil hydraulic actuators as the relative reactivity of the two oil hydraulic actuators with respect to a combined operation for each of the predetermined plurality of types of combined operations in response to the user's operation on the relative reactivity setting screen page. The combined operation setting part 302 stores the set contents for each of the plurality of types of combined operations in the storage part 303 as the current setting 3030. At this time, the current setting 3030 may be stored in the storage part 303 in a manner of being associated with identification information (for example, an operator ID (Identifier) that is predetermined for each of a plurality of operators) (hereinafter referred to as "operator identification information") of the current operator of the shovel 100. For example, when the shovel 100 is started, a manual operation screen page (hereinafter, referred to as an "operator selection screen page") for selecting an operator who actually controls the shovel from the plurality of operators to be registered in advance is displayed on the display device 40, and the controller 30 may identify the operator of the shovel 100 in accordance with the operation content (selection content) by the operator or the like. In addition, an indoor camera for capturing an image of the face of the operator in the cockpit may be installed inside the cabin 10, and the controller 30 may identify the operator of the shovel 100 from the plurality of operators to be registered in advance based on the image recognition result with respect to the image of the indoor camera. As a result, the controller 30 can identify the current operator of the shovel 100 and associates the operator identification information corresponding to the current operator with the current setting 3030. The combined operation setting part 302 transmits the set contents for each of the plurality of types of combined operations, that is, the contents of the current setting 3030, to a management device as an external device through the communication device 44. Thus, an administrator or the like of the management device can confirm the contents of the current setting concerning the relative reactivity of the two oil hydraulic actuators with respect to combined operation of the shovel 100. When the contents of the current setting 3030 are associated with the operator identification information, the administrator or the like of the management device can understand the contents of the setting concerning the relative reactivity that are used by the operators on a per-operator basis.

As described above, the shovel 100 has a function that enables the operator to customize the operability of the shovel 100 according to the preference of the operator. The operability of the shovel 100 is customized by, for example, changing a value such as relative reactivity from an initial value. With this function, it is desirable to enable the operator to know whether the operability of the shovel 100 has been customized, before operation of the shovel 100 is started. In particular, when the shovel 100 is shared by a plurality of operators, it is desirable to enable the operators to know whether the operability of the shovel 100 has been customized. This is because there is a high probability that the operability of the shovel 100 has been customized by another operator.

However, in a configuration in which an operator needs to perform a cumbersome operation in order to know whether the operability of the shovel 100 has been customized, the operator may avoid such a cumbersome operation. If so, the operator may operate the shovel 100 in a state in which the operability which does not match the operator's preference is maintained, and may cause the shovel 100 to perform a movement of a manner not intended by the operator such as lifting the boom 4 too much, closing the arm 5 too much, swinging the upper swinging body 3 too much, moving the boom 4 too fast, moving the arm 5 too fast, or swinging the upper swinging body 3 too fast.

Therefore, according to the present embodiment, the controller 30 is configured to display information about custom setting on the display device 40 automatically, i.e., without the need of manual operation by the operator, before the operation of the shovel 100 is started in a case where a predetermined condition is satisfied. The predetermined condition is, for example, that the operability parameter of the shovel 100 has been customized. Information about custom setting is displayed, for example, when the engine 11 starts or while the gate lock lever D4 is in a locked state. Information about custom setting is, for example, information about the operability of the operating lever. The information about the operability of the operating lever is, for example, information about the relative reactivity.

Specifically, the information about custom setting is, for example, information indicating that the current setting about the operability of the operating lever is different from the initial setting. The information indicating that the current setting about the operability of the operating lever is different from the initial setting is, for example, text information or an icon.

The information about custom setting may include the current setting about the operability of the operating lever. The current setting about the operability of the operating lever is, for example, the relative reactivity value set by the operator in the past.

Figure 8:
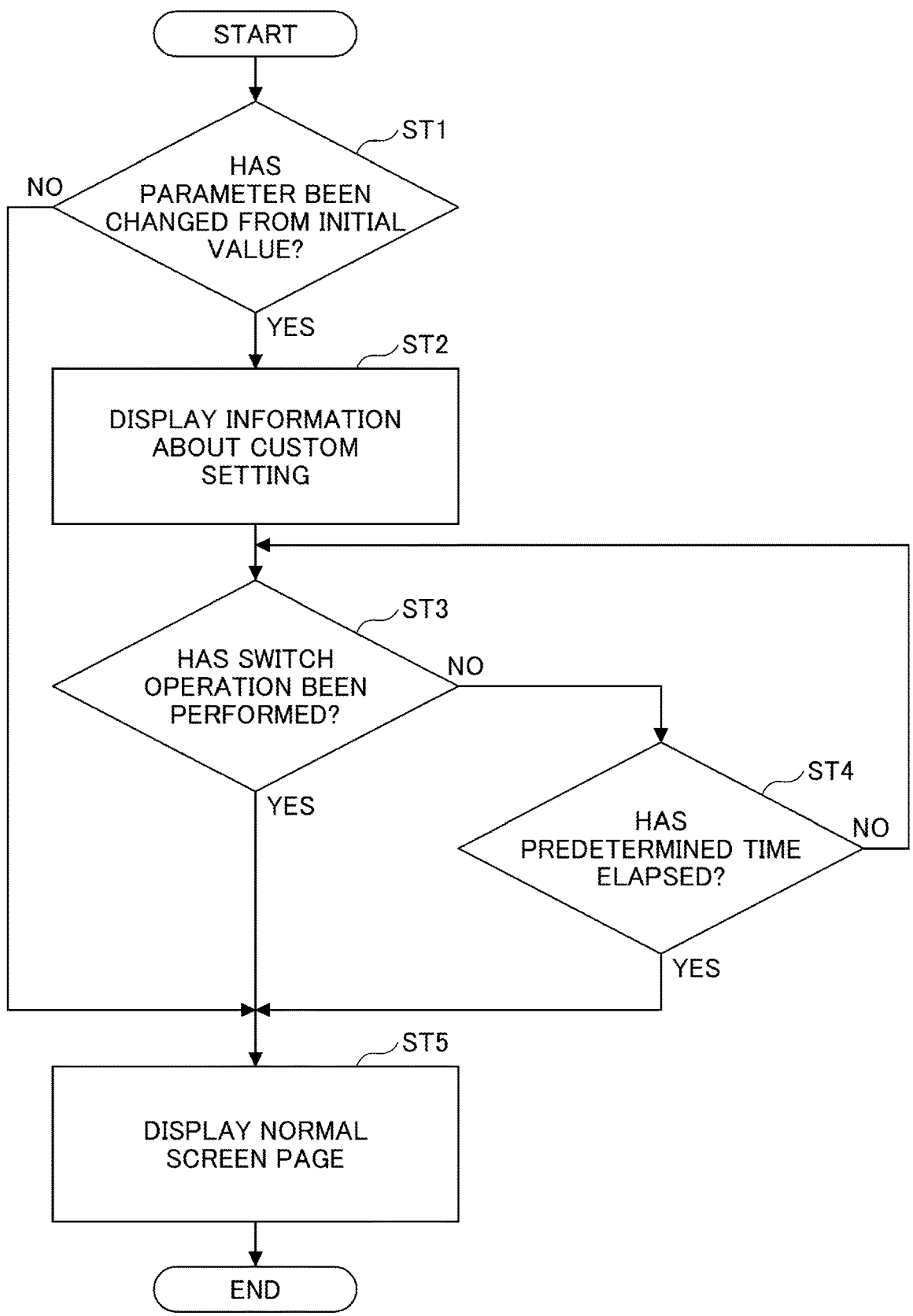
FIG. 8 is a flowchart of an example of a displaying process.

Referring now to FIG. 8, a process (hereinafter referred to as "display process") in which the controller 30 displays information about custom setting on the display device 40 before the operation of the shovel 100 is started will be described. FIG. 8 is a flowchart showing an example of the display process. In the example shown in FIG. 8, the controller 30 executes the display process when the rotational position of the key switch D5 becomes an ACC position. That is, the controller 30 executes the display process when the rotational position of the key switch D5 becomes the ACC position in a state in which the engine 11 has not been started. However, the controller 30 may execute the display process when the state of the gate lock lever D4 has been switched from a locked state to an unlocked state. In this case, the controller 30 may execute the display process when the state of the gate lock lever D4 has been switched from a locked state to an unlocked state, even in a state in which the engine 11 has been started. That is, the controller 30 may be configured not to execute the display process before the state of the gate lock lever D4 is switched from a locked state to an unlocked state even when the engine 11 has been started.

First, the controller 30 determines whether the parameter has been changed from the initial value (step ST1). In the example shown in FIG. 8, the parameter is, for example, a parameter related to the operability of the shovel 100. The parameter related to the operability of the shovel 100 is, for example, the relative reactivity. Specifically, when the value of the relative reactivity is different from the initial value stored as the initial setting 3031, the controller 30 determines that the value of the relative reactivity as the parameter has been changed from the initial value. On the other hand, when the value of the relative reactivity is the same as the initial value stored as the initial setting 3031, the controller 30 determines that the value of the relative reactivity as the parameter has not been changed from the initial value.

When it is determined that the parameter has not been changed from the initial value (NO in step ST1), the controller 30 displays the home screen page (step ST5). In the example shown in FIG. 8, the controller 30 displays the home screen page shown in FIG. 5 on the display device 40. That is, information about custom setting is not displayed when the current setting on the operability of the operating lever is the initial setting.

On the other hand, when it is determined that the parameter has been changed from the initial value (YES in step ST1), the controller 30 displays information about custom setting (step ST2). In the example shown in FIG. 8, the controller 30 displays an information image 550 shown in FIG. 9 in the area 41*r* shown in FIG. 6. In this way, information about custom setting is displayed simultaneously with at least one of setting state information, operating state information, or a captured image. The information image 550 includes a text message indicating that the parameter has been changed from the initial value. The text message ("MULTI FUNCTION SETTING ACTIVE") in FIG. 9 indicates that the relative reactivity setting is active, that is, the relative reactivity value has been changed from the initial value. The text message ("ADDITIONAL PUMP FLOW ACTIVE") in FIG. 9 indicates that an additional supply of hydraulic oil by the hydraulic pump is active, that is, the value of another parameter than the relative reactivity value has been changed from the initial value. However, the information image 550 may be a graphic image such as an icon indicating that the parameter has been changed from the initial value, or it may be a combination of a graphic image and a text message.

Further, information about custom setting displayed on the display device 40 may include more detailed information. The more detailed information may be, for example, the current setting value of the operability of the operating lever, or information included in the setting target combined operation selection screen page 300 shown in FIG. 6, or the relative reactivity setting screen page 400 shown in FIG. 7, or the like.

Thereafter, the controller 30 determines whether or not a switch operation has been performed (step ST3). In the example shown in FIG. 8, the controller 30 determines whether or not the tab 555 shown in FIG. 9 has been touched. A home icon is displayed on the tab 555.

When it is determined that a switch operation has been performed (YES in step ST3), the controller 30 displays the home screen page (step ST5). In the example shown in FIG. 8, when the tab 555 on which the home icon is displayed is touched, the controller 30 displays the home screen page shown in FIG. 5 on the display device 40.

The controller 30 may be configured to display the home screen page on the display device in response to detecting that the operating lever has been operated after displaying information about custom setting. Alternatively, the controller 30 may be configured to display the home screen page on the display device 40 in response to detecting that the state of the gate lock lever D4 has been changed from a locked state to an unlocked state after displaying information about custom setting.

In response to determining that no switch operation has been performed (NO in step ST3), the controller 30 determines whether or not a certain time has elapsed (step ST4). In the example shown in FIG. 8, the controller 30 determines whether or not the elapsed time from the time when information about custom setting is displayed has exceeded a predetermined time in a state where the tab 555 is left untouched.

If it is determined that the predetermined time has not elapsed yet (NO in step ST4), the controller 30 returns to step ST3. That is, the controller 30 repeats the determination in step ST3 and the determination in step ST4 until the predetermined time has elapsed. In the example shown in FIG. 8, the controller 30 repeats the determination as to whether or not the tab 555 has been touched and the determination as to whether or not the elapsed time from the time when information about custom setting is displayed has exceeded the predetermined time.

When it is determined that the predetermined time has elapsed (YES in step ST4), the controller 30 displays the home screen page (step ST5). In the example shown in FIG. 8, if the elapsed time from the time when information about custom setting is displayed exceeds the predetermined time before the tab 555 is touched, the controller 30 displays the home screen page shown in FIG. 5 on the display device 40. That is, if the elapsed time from the time when information about custom setting is displayed exceeds the predetermined time without the tab 555 being touched, the controller 30 erases information about custom setting from the image display area 41*n* in the image display part 41 of the display device 40. This is because of enabling other information to be displayed.

By this display process, the controller 30 can automatically display information about custom setting on the display device 40 without requiring the operator to perform cumbersome manual operation, for example, when the operability parameter of the shovel 100 has been changed from the initial value. The operator can easily know whether or not the operability of the shovel 100 has been customized before starting operation of the shovel 100 without performing cumbersome manual operation. The cumbersome manual operation is, for example, manual operation such as pressing one or more tabs of the tabs 41*p*1-41*p*7 shown in FIG. 5 once or more times to display the relative reactivity setting screen page shown in FIG. 7 on the display device 40 one by one.

Therefore, the controller 30 can avoid a situation in which an operator operates the shovel 100 in a state in which operability not suited to the operator's preference is maintained. This is because the operator can notice that the operability of the shovel 100 has been customized by looking at information about custom setting displayed on the display device 40. In addition, if information about custom setting displayed on the display device 40 contains detailed information, the operator can easily know how the operability of the shovel 100 has been customized and can easily know whether the custom setting is the desired custom setting. Furthermore, even if the current custom setting is different from the desired custom setting, the operator can easily know which parameter value should be changed and can achieve the desired custom setting by the minimum required manual operation.

As a result, the controller 30 can prevent shovel 100 movement unintended by the operator, such as the boom 4 being lifted too high, the arm 5 closing too much, the upper swinging body 3 swinging too much, the boom 4 moving too fast, the arm 5 moving too fast, or the upper swinging body 3 swinging too fast, thereby enhancing the safety of an operator working around the shovel 100.

It should be noted that the controller may display information about custom setting on the display device 40 before operation of the shovel 100 is started, regardless of whether the parameter has been changed from the initial value. For example, the controller 30 may display information about custom setting on the display device 40 when the rotational position of the key switch D5 becomes the ACC position or when the state of the gate lock lever D4 is changed from a locked state to an unlocked state. In this case, when the parameter has not been changed from the initial value, a text message or the like indicating that the parameter is the initial value may be displayed as information about custom setting. In this way, information about custom setting may be displayed in a state where safety is ensured. The state where safety is ensured is, for example, a state where the shovel does not move even when the operating lever is operated.

Figure 10:
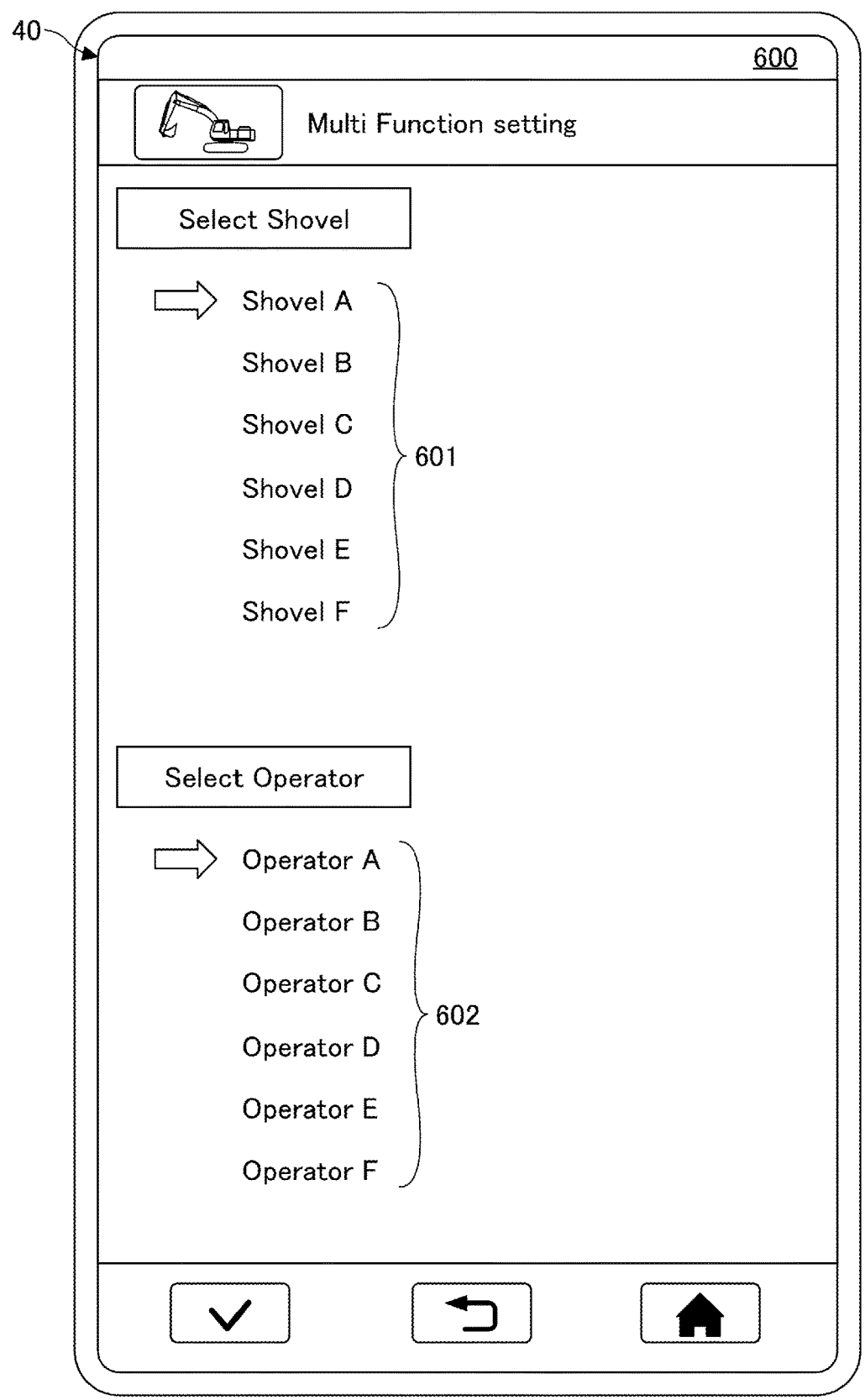
FIG. 10 is a diagram showing an example of a shovel and operator selection screen page.

Next, a shovel and operator selection screen page will be described with reference to FIG. 10. FIG. 10 is a diagram showing an example of a shovel and operator selection screen page (a shovel and operator selection screen page 600) displayed on the display device 40.

As shown in FIG. 10, the shovel and operator selection screen page 600 includes a list 601 of a plurality of selectable shovels 100 and a list 602 of a plurality of selectable operators.

By performing an operation to select and determine any shovel 100 or operator through the manually operating part 42, the user can use the custom setting related to the operability of the shovel 100 such as the relative reactivity stored in association with the selected shovel or operator. The display contents of the display device 40 then transition from the shovel and operator selection screen page 600 to the setting target combined operation selection screen page.

As described above, the shovel 100 according to the embodiment of the present invention has the lower traveling body 1, the upper swinging body 3 swingably mounted on the lower traveling body 1, the cabin 10 as an operator's cab mounted on the upper swinging body 3, and the display device 40 disposed in the cabin 10. The shovel 100 is configured to display information about custom setting on the display device 40 before a start of operation.

"Before a start of operation" is, for example, when the rotational position of the key switch D5 becomes the ACC position, the ON position, or the START position; while the gate lock lever D4 is in a locked state; while the gate lock lever D4 is in a locked state after a start of the engine; while the operating lever is in the neutral position; or while the operating lever is in the neutral position after a start of the engine.

Information about custom setting may be displayed, for example, while the engine is started, or may be displayed while the gate lock lever is in a locked state.

For example, the shovel 100 is configured to, when the value of the parameter related to the operability of the shovel 100 is changed from the initial value, display information about custom setting on the display device 40 automatically, that is, without the need of manual operation such as switch operation by the operator, when the rotational position of the key switch D5 becomes the ACC position.

With this configuration, the shovel 100 can automatically display information about custom setting on the display device 40 before operation of the shovel 100 starts, even if the operator does not perform an operation to display the relative reactivity setting screen page on the display device 40. Therefore, the operator can know, for example, whether the parameter related to the operability of the shovel 100 has been customized, without performing a cumbersome manual operation.

Information about custom setting may be, for example, information about the operability of the operating lever. The information about the operability of the operating lever may be, for example, information about movement of the oil hydraulic actuator occurring in response to the operating lever being operated, that is, in response to the operating lever being tilted (moved from the neutral position). Specifically, the information about the operability of the operating lever may be information about correspondence relationship between operation content of the operating lever (for example, the operation amount, the operation speed, the operation acceleration, etc.) and the operation content of the oil hydraulic actuator (for example, the motion amount, the motion speed, the motion acceleration, etc.) under the condition in which the conditions related to the engine 11 are uniform. Alternatively, the information about the operability of the operating lever may be information about the distribution of the flow rates of hydraulic oil supplied to the respective ones of the plurality of hydraulic cylinders when a combined operation is performed. Information about the rotational speed of the engine 11 displayed in the engine speed level display area 41i or the engine control state display area 41e or the like is not included in the information about the operability of the operating lever. The information about custom setting may be, for example, information indicating that the current setting of the operability of the operating lever is different from the initial setting. The information about custom setting may include the current setting of the operability of the operating lever. The current setting of the operability of the operating lever is, for example, the value of the current setting 3030 of the relative reactivity.

In addition, the information about the operability of the operating lever may be information about the relative reactivity of a single oil hydraulic actuator with respect to the operation content (for example, the operation amount, the operation speed, the operation acceleration, etc.) of the single operating lever under the condition in which the conditions relating to the engine 11 are uniform when an individual operation of moving the single oil hydraulic actuator is performed. Specifically, when such an individual operation is performed, the information about the operability of the operating lever may be the information about the amount of hydraulic oil supplied to the oil hydraulic actuator with respect to the operation content of the single operating lever under the condition in which the conditions relating to the engine 11 are uniform. Alternatively, when such an individual operation is performed, the information about the operability of the operating lever may be information about the opening amount (the opening area) of the direction control valve (the control valve 171, 172, 173, 174, 175L, 175R, 176L, or 176R) with respect to the operation content of the single operating lever under the condition in which the conditions relating to the engine 11 are uniform.

When a combined operation for moving a plurality of oil hydraulic actuators is performed, the information about the operability of the operating lever may be information about the relative reactivity of the plurality of oil hydraulic actuators with respect to the operation content (for example, the operation amounts, the operation speeds, the operation accelerations, etc.) of the plurality of operating levers under the condition in which the conditions relating to the engine 11 are uniform. When such a combined operation is performed, the information about the operability of the operating lever may be information about the distribution of the amounts of hydraulic oil supplied to the plurality of oil hydraulic actuators under the condition in which the conditions relating to the engine 11 are uniform. Alternatively, when such a combined operation is performed, the information about the operability of the operating lever may be information about the opening amount (the opening area) of the direction control valve (the control valve 171, 172, 173, 174, 175L, 175R, 176L, or 176R) corresponding to each of the plurality of oil hydraulic actuators under the condition in which conditions relating to the engine 11 are uniform.

The embodiment of the present invention has been described in detail above. However, the present invention is not limited to the embodiment described above. The embodiment described above may be subject to various modifications, substitutions, etc., without departing from the scope of the present invention. In addition, the features described separately may be combined, provided that no technical inconsistencies arise.

Thus, it should be understood that the invention is not limited to the above-described embodiment, but may be modified into various forms on the basis of the spirit of the invention. Additionally, the modifications are included in the scope of the invention.

Figure 9:
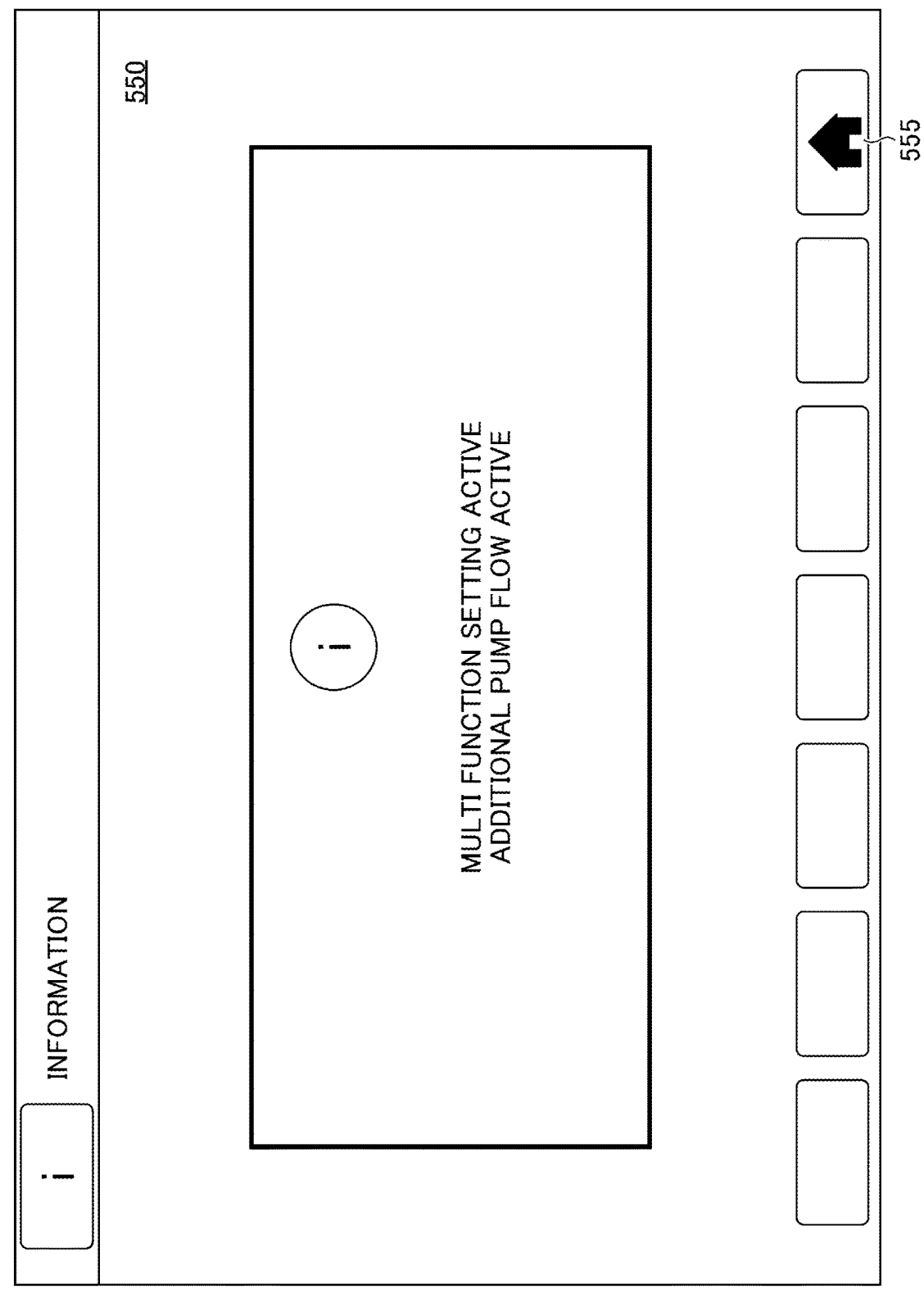
FIG. 9 is a diagram showing an example of a configuration of an information image.
Figure 11:
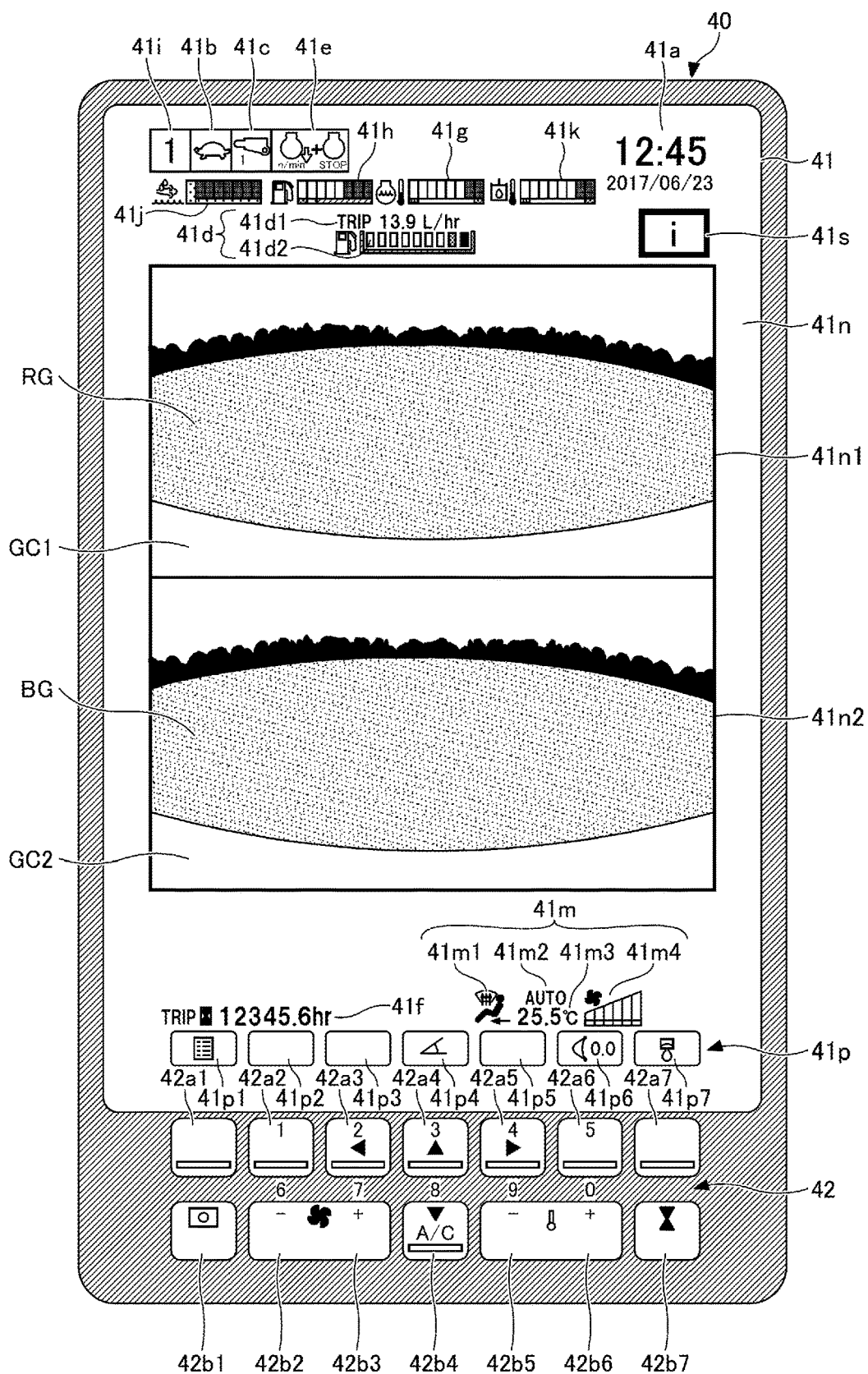
FIG. 11 is a diagram showing another example of the configuration example of the image display part and the manually operating part of the display device.

For example, in the embodiment described above, the controller 30 provides information about custom setting to the operator by displaying the information image 550 as shown in FIG. 9. However, in addition to displaying the information image 550, or instead of displaying the information image 550, the controller 30 may provide information about custom setting to the operator by outputting a sound such as a buzzer sound or voice guidance using a speaker as the sound output device. Alternatively, the controller 30 may be configured to display an image 41s as shown in FIG. 11 instead of displaying the information image 550 in the area 41r shown in FIG. 6. FIG. 11 is a diagram showing another configuration example of the image display part 41 and the manually operating part 42 of the display device 40, and corresponds to FIG. 5. The information displayed on the image display part 41 shown in FIG. 11 is different from the information displayed on the image display part 41 shown in FIG. 5 in that the information includes the image 41s. The image 41s is an icon indicating that there is information to be provided to the operator of the shovel 100. The display of the image 41s may be omitted if there is currently no information to be provided to the operator of the shovel 100. The information to be provided to the operator of the shovel 100 is, for example, that the parameter has been changed from the initial value. In this case, the operator who has seen the image 41s can easily know that there is information to be checked (for example, that the parameter has been changed from the initial value). In this case, the operator can cause detailed information about the information to be checked by the operator to be displayed by, for example, touching the part where the image 41s is displayed. The detailed information is, for example, information included in the setting target combined operation selection screen page 300 shown in FIG. 6, the relative reactivity setting screen page 400 shown in FIG. 7, and/or the like. The image 41s may be an icon or a text message indicating that the parameter related to the operability has been changed from the initial value. The image 41s may be displayed in a blinking manner or may be displayed while being emphasized in another manner.

The shovel 100 may be a remotely operated shovel. In this case, the operator in a remote control room exchanges information between the shovel 100 and the remote control room through the communication device 44 mounted on the shovel 100. For example, the operator operates a key switch installed in the remote control room to start the shovel 100. At this time, a controller installed in the remote control room transmits a start command to the shovel 100. The shovel 100 starts when the start command is received through the communication device 44, and transmits a warning command to the remote control room when the parameter has been changed from the initial value. The controller of the remote control room which has received the warning command displays information about custom setting on a display device. This display device is another example of the display device for the shovel and is installed in the remote control room so that the operator can use it when operating the shovel 100. The display device may be, for example, a display installed to surround the operator. In this case, the position on the display where the information about custom setting is displayed may be a position corresponding to the position of the display device 40 in the cabin 10 (for example, a position in front of the operator diagonally to the right). In this case, the operator in the remote control room can have an immersive feeling as if he or she is looking at the display device in the cabin 10.

DESCRIPTION OF SIGN

1 . . . Lower Traveling Body
1L, 1R . . . Traveling Oil Hydraulic Motors
2 . . . Swinging Mechanism
2A . . . Swinging Oil Hydraulic Motor
3 . . . Upper Swinging body
4 . . . Boom
5 . . . Arm
6 . . . Bucket
7 . . . Boom Cylinder
8 . . . Arm Cylinder
9 . . . Bucket Cylinder
10 Cabin
11 . . . Engine
11a . . . Alternator
11b . . . Starter
13L, 13R . . . Regulators
14, 14L, 14R . . . Main Pumps
14a . . . Regulator
14b . . . Discharge Pressure Sensor
14c . . . Oil Temperature Sensor
15 . . . Pilot Pump
17 . . . Control Valve Unit
18L, 18R . . . Chokes
19L, 19R . . . Control Pressure Sensors
26 . . . Operator
28L, 28R . . . Discharge Pressure Sensors
29 . . . Operating Pressure Sensor
30 . . . Controller
35 . . . Switching Valve
40 . . . Display Device
40a . . . Control Part
41 . . . Image Display Part
42 . . . Manually Operating Part
49 . . . Alarm Device
50 . . . Operator's Side Manually Operating Part
70 . . . Storage battery
74 . . . Engine Control Unit
75 . . . Dial
76 . . . ECO button
80 . . . Image Capturing Device
80B . . . Rear Camera
80L . . . Left Camera
80R . . . Right Camera
100 . . . Shovel
171-174, 175L, 175R, 176L, 176R . . . Control Valves
301 . . . Manually Operating Screen Page Display processing Part
302 . . . Combined Operation Setting Part
303 . . . Memory Part
3030 . . . Current Setting
3031 . . . Initial Setting
3032 . . . Custom Setting
BG . . . Rear Image
C1L, C1R . . . Center Bypass Oil Passages
C2L, C2R . . . Parallel Oil Passages
D4 . . . Gate Lock Lever
D5 . . . Key Switch
GC1, GC2 . . . Images
RG . . . Right Image

What is claimed is:

1. A shovel comprising:
a drive source;
a lower traveling body;
an upper swinging body swingably mounted on the lower traveling body;
an operator's cab mounted on the upper swinging body;
an operating device provided in the operator's cab, the operating device being configured to operate the shovel;
a display provided in the operator's cab; and
a processor configured to automatically start a process for displaying information about custom setting on the display in response to an operation for starting the drive source being performed in a state where the drive source is not started or in response to the operating device being switched from a disabled state to an enabled state, before a start of operation of the shovel.

2. The shovel as claimed in claim 1, wherein the processor is configured to display the information about custom setting with the drive source being started or a gate lock lever being in a locked state.

3. The shovel as claimed in claim 1, wherein
the operating device includes an operating lever, and
the information about custom setting is information relating to operability of the operating lever.

4. The shovel as claimed in claim 3, wherein the information about custom setting is information notifying that there is a difference between a current setting and an initial setting with respect to the operability of the operating lever.

5. The shovel as claimed in claim 3, wherein the information about custom setting includes contents of a current setting relating to the operability of the operating lever.

6. The shovel as claimed in claim 4, wherein the processor is configured to display the information notifying that there is the difference between the current setting of operability and the initial setting as text information or as an icon.

7. The shovel as claimed in claim 1, further comprising:
a speaker,
wherein the processor is configured to output the information about custom setting as a sound from the speaker.

8. The shovel as claimed in claim 1, wherein the processor is configured to display the information about custom setting simultaneously with at least one of setting state information, operating state information, or a captured image on the display.

9. The shovel as claimed in claim 1, wherein the processor is configured to display the information about custom setting with safety being ensured.

10. The shovel as claimed in claim 1, wherein the processor is configured to start the process for displaying the information about custom setting in response to a start of power supply to the processor or in response to a gate lock lever being switched from a locked state to an unlocked state.

11. The shovel as claimed in claim 1, wherein
the processor is configured to
determine whether a current setting of the shovel is different from an initial setting of the shovel, and
display the information about custom setting in response to determining that the current setting is different from the initial setting.

12. The shovel as claimed in claim 11, wherein the processor is configured not to display the information about custom setting in response to determining that the current setting is not different from the initial setting.

13. The shovel as claimed in claim 12, wherein the processor is configured to display a home screen page on the display in response to determining that the current setting is not different from the initial setting.

14. The shovel as claimed in claim 1, wherein
the processor is configured to
determine whether a predetermined time has passed since the information about custom setting is displayed on the display, and
erase the information about custom setting from the display.

15. The shovel as claimed in claim 14, wherein
the processor is configured to
display a switch simultaneously with the information about custom setting on the display, the switch being configured to be operated to display a home screen page, and
determine whether the predetermined time has passed without an operation of the switch since the information about custom setting is displayed on the display.

16. The shovel as claimed in claim 1, further comprising:
a plurality of actuators,
wherein the information about custom setting includes information about a relative degree of responses of two actuators among the plurality of actuators with respect to an operation input to the operating device during a combined operation in which the two actuators are simultaneously operated by the operating device.

17. A display device for a shovel, the shovel including a drive source, a lower traveling body, and an upper swinging body swingably mounted on the lower traveling body, wherein
the display device is configured to display information about custom setting after a process for displaying the information about custom setting is automatically started in response to an operation for starting the drive source being performed in a state where the drive source is not started or in response to an operating device configured to operate the shovel being switched from a disabled state to an enabled state, before operation of the shovel is started.

18. A controller for a shovel, the shovel including a drive source, a lower traveling body, and an upper swinging body swingably mounted on the lower traveling body, the controller comprising:
a processor configured to automatically start a process for displaying information about custom setting on a display in response to an operation for starting the drive source being performed in a state where the drive source is not started or in response to an operating device configured to operate the shovel being switched from a disabled state to an enabled state, before a start of operation of the shovel.

19. The controller as claimed in claim 18, wherein
the processor is configured to
receive a command transmitted from the shovel, the command being transmitted in response to the shovel determining that there is a difference between a current setting and an initial setting with respect to operability of the operating device, and
display the information about custom setting in response to receiving the command from the shovel.

* * * * *